US009437246B2

(12) United States Patent
Homma et al.

(10) Patent No.: US 9,437,246 B2
(45) Date of Patent: Sep. 6, 2016

(54) INFORMATION PROCESSING DEVICE, INFORMATION PROCESSING METHOD AND PROGRAM

(71) Applicant: Sony Corporation, Tokyo (JP)

(72) Inventors: Fuminori Homma, Tokyo (JP); Yasushi Okumura, Tokyo (JP); Tatsushi Nashida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 106 days.

(21) Appl. No.: 14/376,163

(22) PCT Filed: Dec. 12, 2012

(86) PCT No.: PCT/JP2012/082188
§ 371 (c)(1),
(2) Date: Aug. 1, 2014

(87) PCT Pub. No.: WO2013/118387
PCT Pub. Date: Aug. 15, 2013

(65) Prior Publication Data
US 2015/0016801 A1    Jan. 15, 2015

(30) Foreign Application Priority Data

Feb. 10, 2012    (JP) ................................. 2012-027088

(51) Int. Cl.
*G11B 27/19*    (2006.01)
*G06F 3/0485*    (2013.01)
(Continued)

(52) U.S. Cl.
CPC ............. *G11B 27/19* (2013.01); *G06F 3/0485* (2013.01); *G06F 3/04883* (2013.01); *G06F 3/04886* (2013.01); *G09B 19/06* (2013.01); *H04N 21/4316* (2013.01); *H04N 21/47217* (2013.01); *H04N 21/4884* (2013.01)

(58) Field of Classification Search
CPC ............. G06F 3/0485; G06F 3/04883; G06F 3/04886; G09B 19/06; G11B 27/19; H04N 21/4316; H04N 21/47217; H04N 21/4884
USPC ................. 386/230, 243; 345/173; 348/468; 434/309; 715/719, 720
See application file for complete search history.

(56) References Cited

U.S. PATENT DOCUMENTS

2008/0297483 A1* 12/2008 Kim .................... G06F 3/04817
                                                      345/173
2008/0309631 A1* 12/2008 Westerman ........... G06F 1/3203
                                                      345/173

(Continued)

FOREIGN PATENT DOCUMENTS

JP        09-115224        5/1997
JP        2010-087661 A    4/2010
JP        2010-102666 A    5/2010

OTHER PUBLICATIONS

International Search Report from International Publication PCT/JP2012/082188 mailed Mar. 12, 2013.

*Primary Examiner* — Thai Tran
*Assistant Examiner* — Stephen Smith
(74) *Attorney, Agent, or Firm* — Chip Law Group

(57) ABSTRACT

There is provided an information processing device including a display control unit that controls display of a display screen containing a content display area and a subtitles display area, and an operation recognition unit that, when a first operation on the subtitles display area is detected, recognizes that an operation to perform second processing is performed, the second processing being different from first processing performed when the first operation on the content display area is detected.

9 Claims, 34 Drawing Sheets

(51) Int. Cl.
*H04N 21/431* (2011.01)
*H04N 21/472* (2011.01)
*H04N 21/488* (2011.01)
*G06F 3/0488* (2013.01)
*G09B 19/06* (2006.01)

(56) References Cited

U.S. PATENT DOCUMENTS

| | | | | |
|---|---|---|---|---|
| 2010/0231537 A1* | 9/2010 | Pisula | ............ | G06F 3/0481 345/173 |
| 2011/0231796 A1* | 9/2011 | Vigil | ............ | G06F 3/04883 715/810 |
| 2012/0047437 A1* | 2/2012 | Chan | ............ | G06F 3/0482 715/720 |
| 2012/0151320 A1* | 6/2012 | McClements, IV | . | G06Q 10/101 715/230 |
| 2012/0166950 A1* | 6/2012 | Frumar | ............ | G06F 3/04883 715/719 |
| 2012/0236201 A1* | 9/2012 | Larsen | ............ | H04N 21/235 348/468 |
| 2012/0315009 A1* | 12/2012 | Evans | ............ | H04N 5/765 386/230 |
| 2013/0177891 A1* | 7/2013 | Hammerschmidt | ..... | G09B 5/06 434/309 |

* cited by examiner

FIG. 2
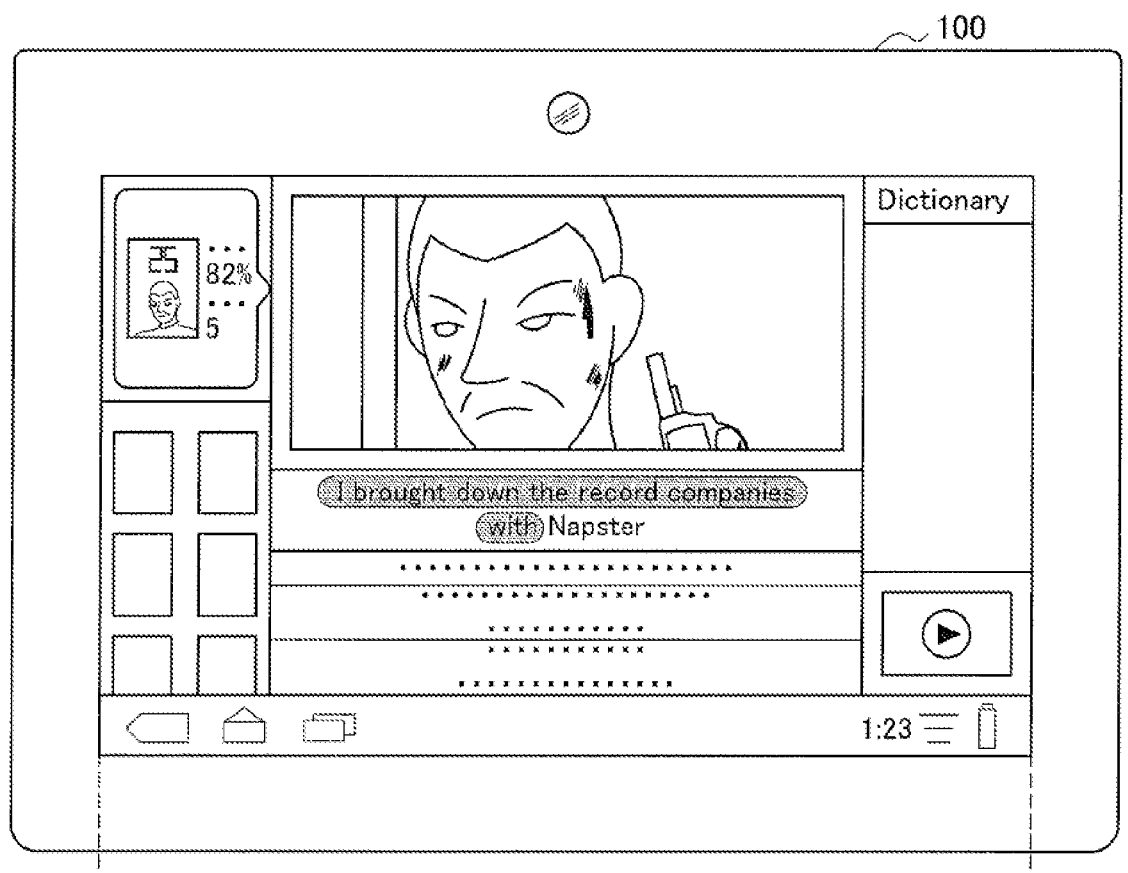
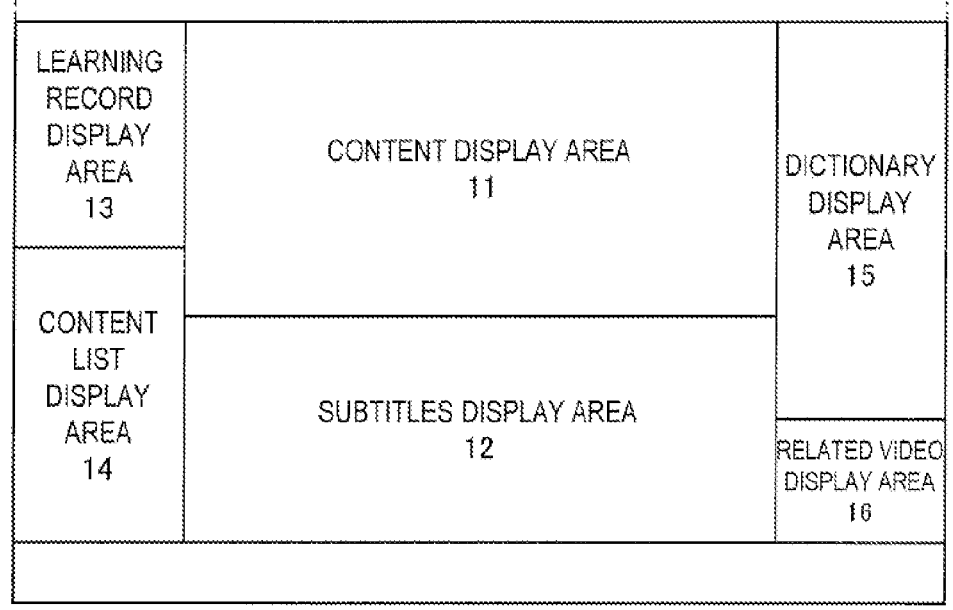

FIG. 6

SUBTITLES DATA 1
01:24:86,844 -->01:27:58,804
Welcome to New Tokyo
International Airport, Narita.

2
01:27:58,988 -->01:28:99,021
-Welcome to Tokyo.
-Thank you very much.

3
01:28:99,702 -->01:30:33,403
-My name is Kawasaki.
Nice to meet you.

⇒ SUBTITLES ID
⇒ SUBTITLES DISPLAY TIME
⇒ SUBTITLES TEXT

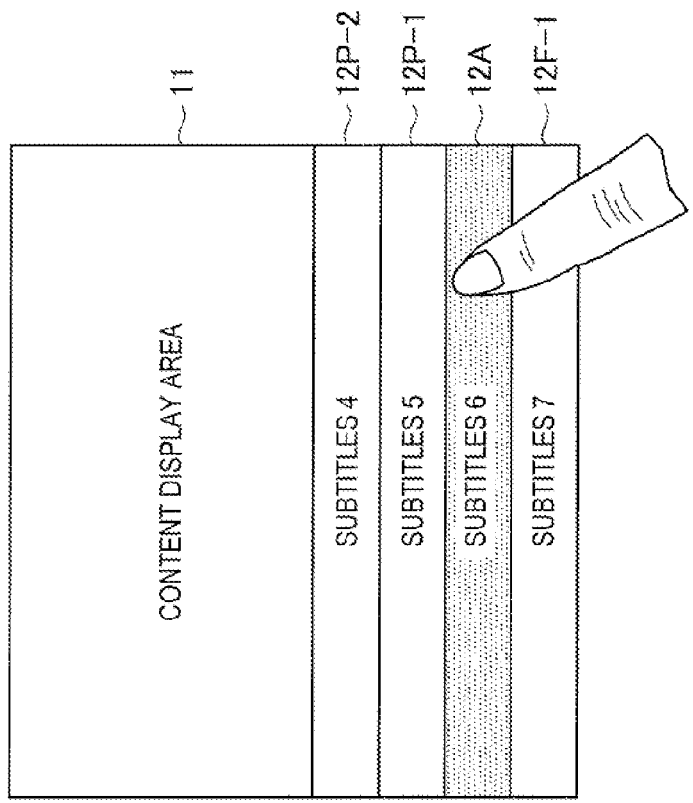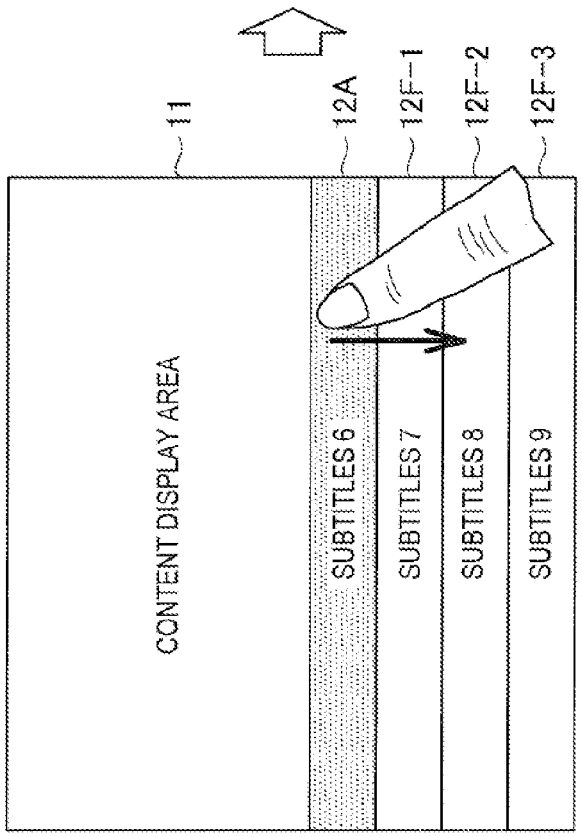
FIG. 10

FIG. 13
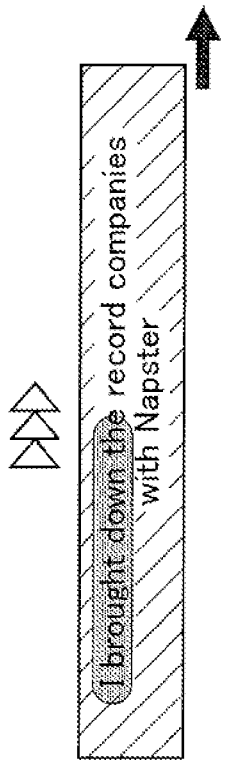
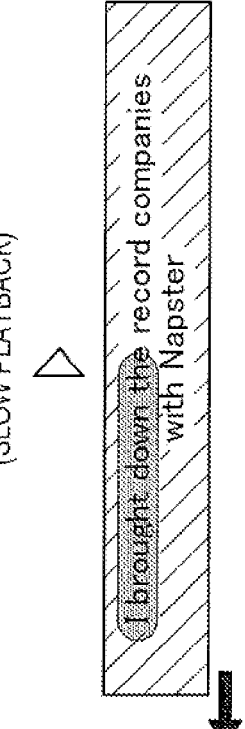
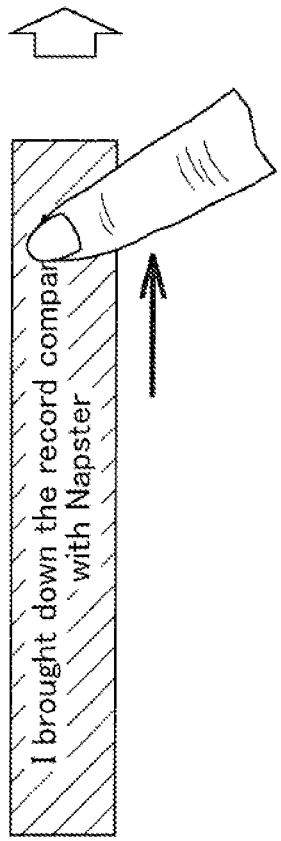
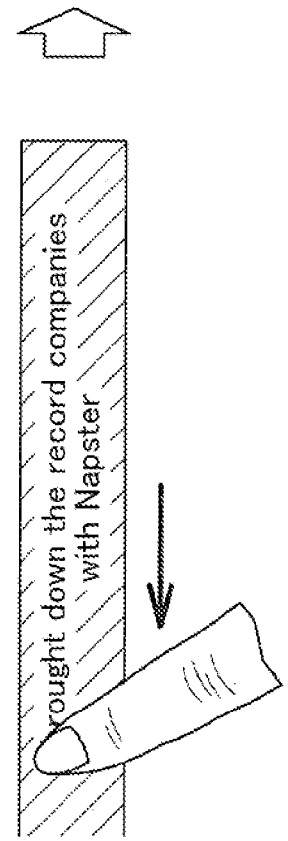

FIG. 14
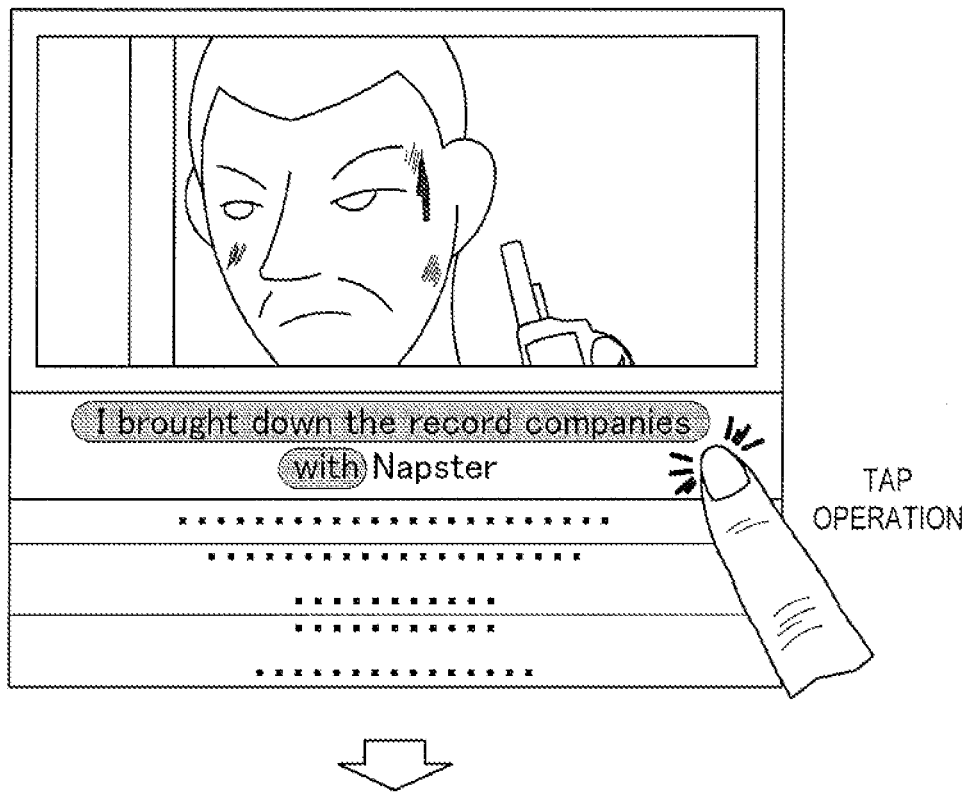
TAP OPERATION
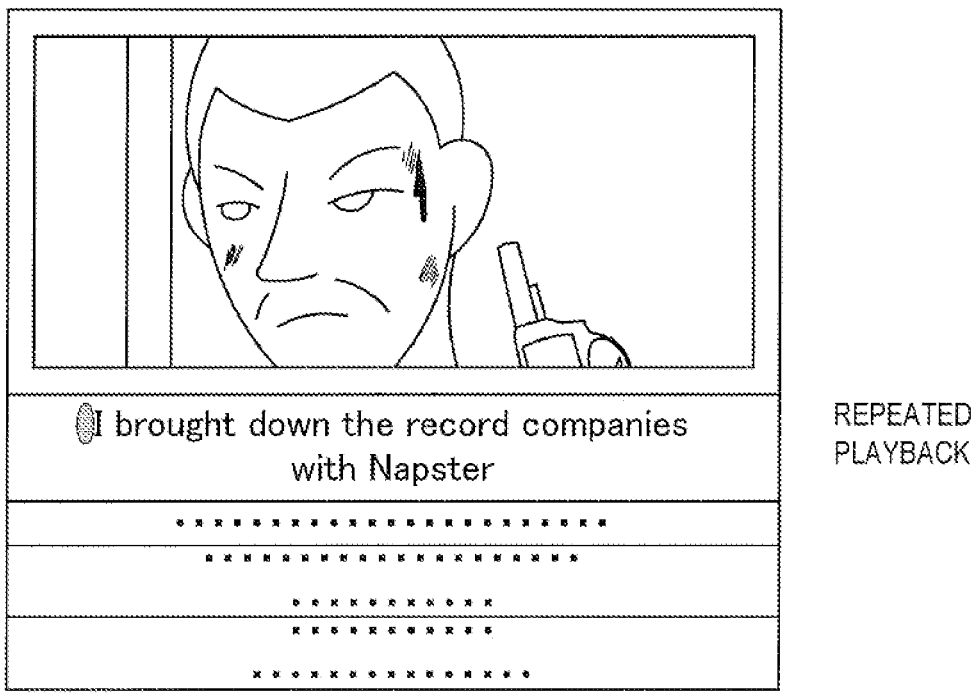
REPEATED PLAYBACK

FIG. 15

| REPEAT OPERATION | PLAYBACK SPEED OF REPEATED PLAYBACK |
|---|---|
| SINGLE TAP | NORMAL SPEED |
| LONG PRESSING | SLOW PLAYBACK |
| DOUBLE TAP | FAST PLAYBACK (PLAYBACK SPEED IN ACCORDANCE WITH TAP INTERVAL) |

FIG. 16
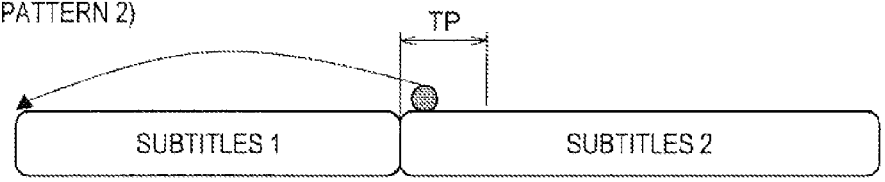
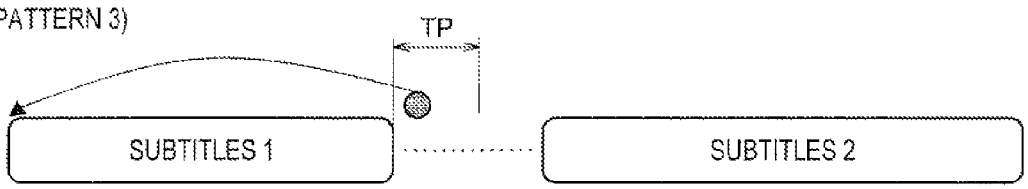
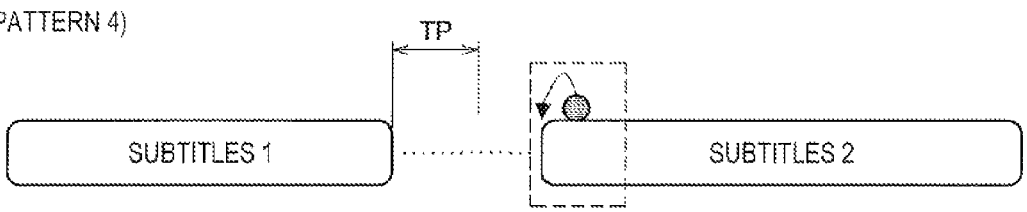

FIG. 18
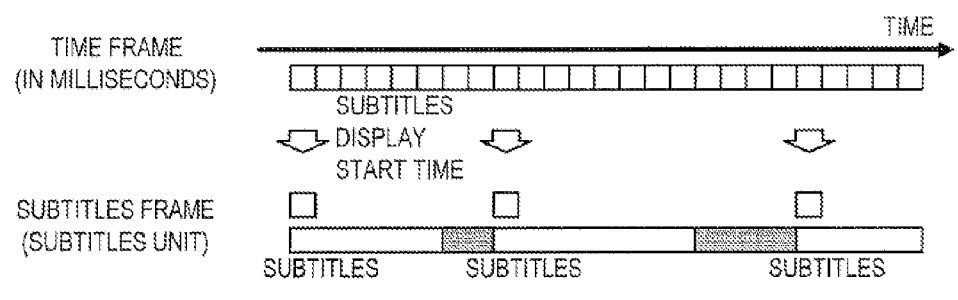
EXAMPLE OF Pause
OPERATION
ALIGNMENT TO SUBTITLES
START POSITION DURING
Pause → Play OPERATION
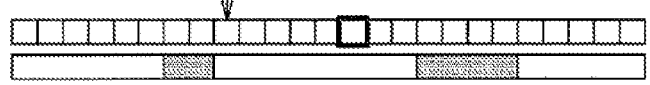
EXAMPLE OF
Seeking
OPERATION
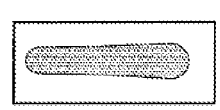
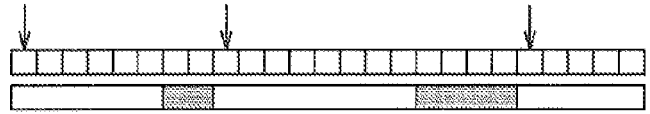

FIG. 22
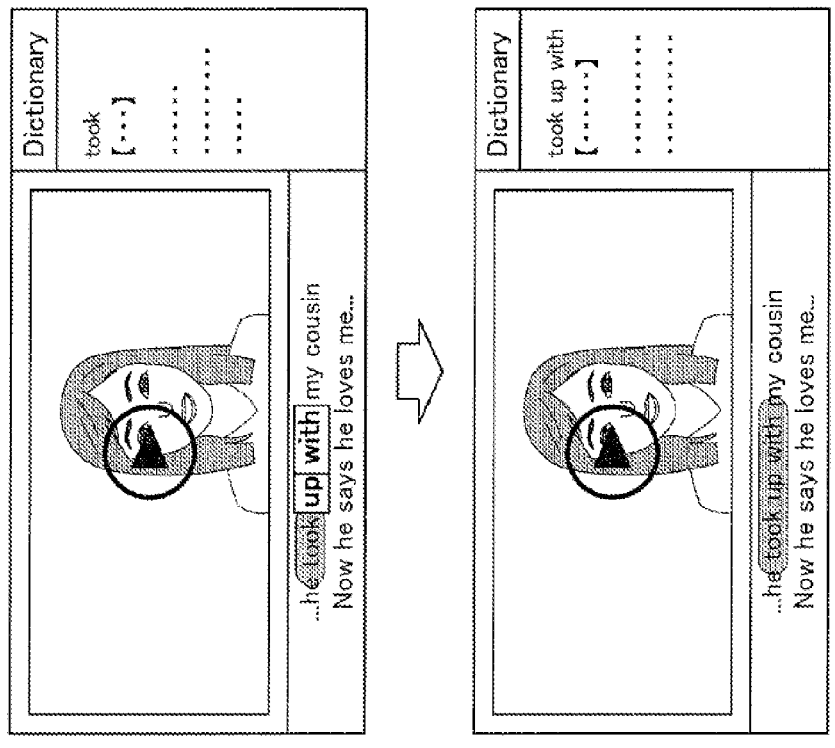
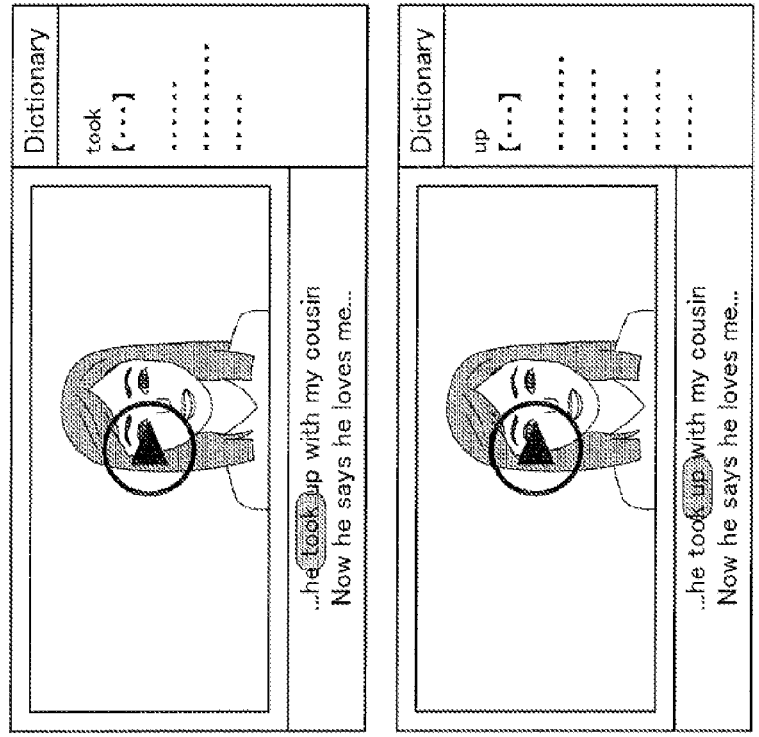

FIG. 25
| CONTENT ID | SUBTITLES ID | COORDINATE INFORMATION | ADDITIONAL INFORMATION (CM, PERSONAL DATA etc.) |
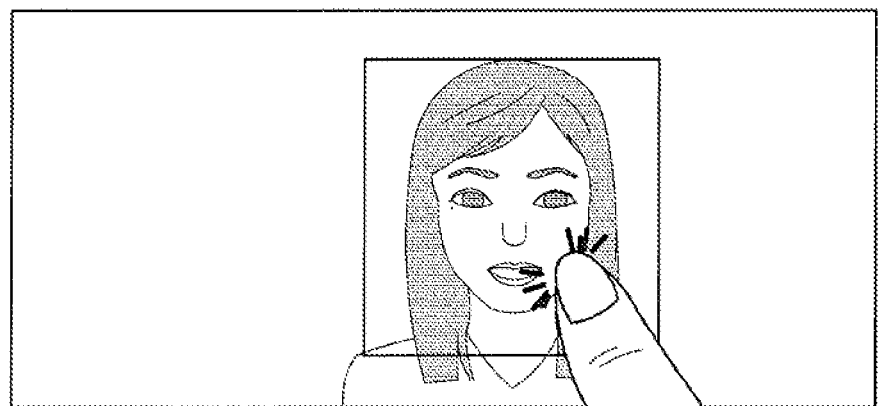
ADD META INFORMATION WITH
SUBTITLES ID x SCREEN COORDINATES
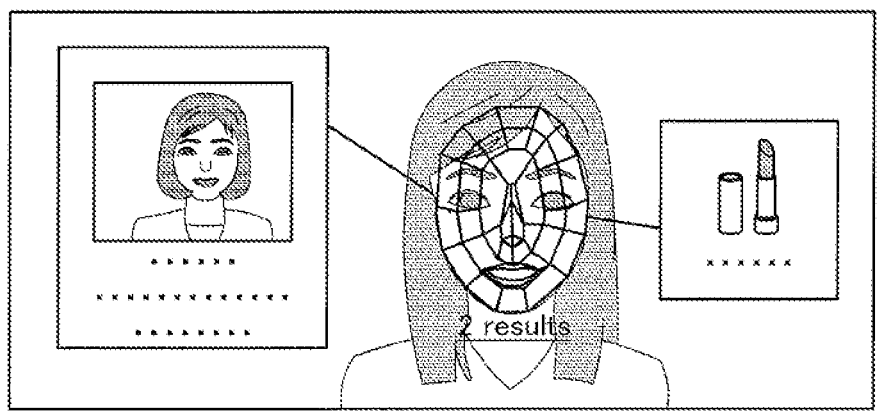
DISPLAY META DATA BY TOUCHING

FIG. 26
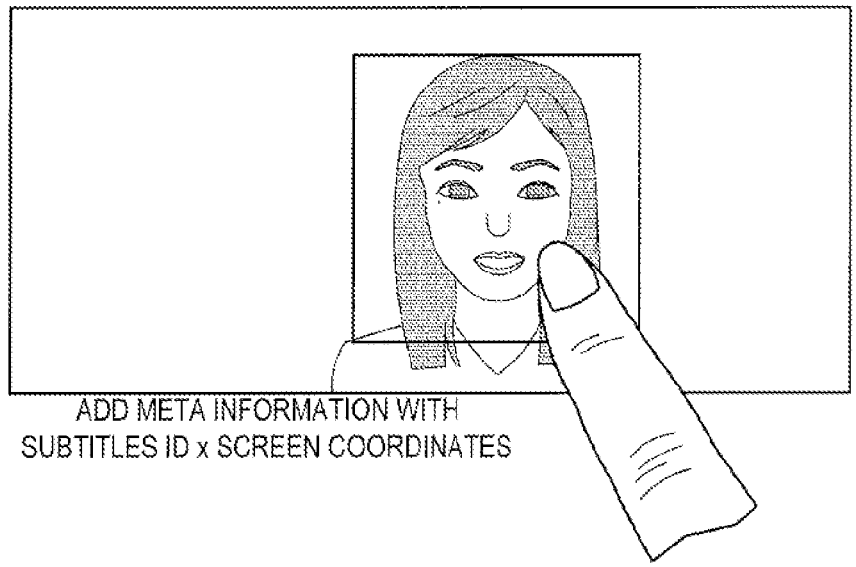
ADD META INFORMATION WITH
SUBTITLES ID x SCREEN COORDINATES
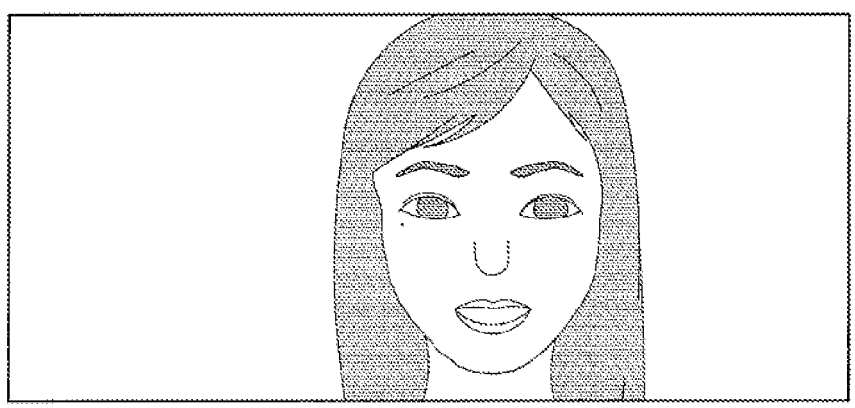
FACE IMAGE RECOGNITION (VISEME ANALYSIS)
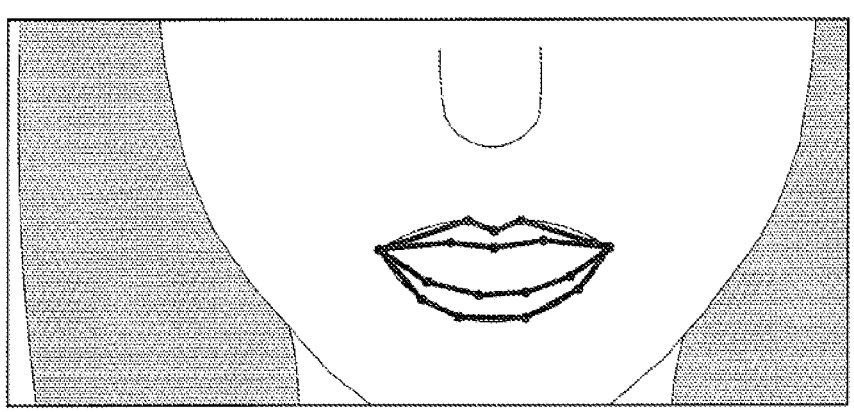

INFORMATION PROCESSING DEVICE, INFORMATION PROCESSING METHOD AND PROGRAM

CROSS-REFERENCE TO RELATED APPLICATION

The present application is a national phase entry under 35 U.S.C. §371 of International Application No. PCT/JP2012/082188 filed Dec. 12, 2012, published on Aug. 15, 2013 as WO 2013/118387 A1, which claims priority from Japanese Patent Application No. JP 2012-027088, filed in the Japanese Patent Office on Feb. 10, 2012.

TECHNICAL FIELD

The present disclosure relates to an information processing device, an information processing method, and a program.

The present disclosure relates to an information processing device, an information processing method, and a program.

BACKGROUND ART

When learning a language other than one's mother tongue, learning with video is an effective way of learning. For example, Patent Literature 1 discloses a playback device that can search a playback position in video based on subtitles added to the video. This playback device can repeatedly perform playback based on the subtitles. Therefore, sections that are difficult to hear can be repeatedly played back, thus enhancing learning effects.

CITATION LIST

Patent Literature

Patent Literature 1: JP H09-115224A

SUMMARY OF INVENTION

Technical Problem

In this field, however, it has been desired to improve the convenience of users by further enhancing learning efficiency.

Solution to Problem

According to an embodiment of the present disclosure, there is provided an information processing device including a display control unit that controls display of a display screen containing a content display area and a subtitles display area, and an operation recognition unit that, when a first operation on the subtitles display area is detected, recognizes that an operation to perform second processing is performed, the second processing being different from first processing performed when the first operation on the content display area is detected.

According to an embodiment of the present disclosure, there is provided an information processing method including controlling display of a display screen containing a content display area and a subtitles display area, and when a first operation on the subtitles display area is detected, recognizing that an operation to perform second processing is performed, the second processing being different from first processing performed when the first operation on the content display area is detected.

According to an embodiment of the present disclosure, there is provided a program for causing a computer to function as an information processing device including a display control unit that controls display of a display screen containing a content display area and a subtitles display area, and an operation recognition unit that, when a first operation on the subtitles display area is detected, recognizes that an operation to perform second processing is performed, the second processing being different from first processing performed when the first operation on the content display area is detected.

Advantageous Effects of Invention

According to the present disclosure, as described above, an information processing device, an information processing method, and a program that are capable of improving the convenience of language learning.

BRIEF DESCRIPTION OF DRAWINGS

FIG. 2 is an explanatory view showing a first example of a display screen configuration provided by the language learning system according to the embodiment.

FIG. 6 is an explanatory view showing an example of subtitles data added to movie content played back by the user device according to the embodiment.

FIG. 10 is an explanatory view showing an operation example on the subtitles display area of the user device according to the embodiment.

FIG. 13 is an explanatory view showing an example of a playback speed operation by an active subtitles display area of the user device according to the embodiment.

FIG. 14 is an explanatory view showing an example of a repeated playback operation of the user device according to the embodiment.

FIG. 15 is an explanatory view showing variation of the repeated playback operation and a corresponding playback speed of the user device according to the embodiment.

FIG. 16 is an explanatory view illustrating an example of a relationship between a tap position of the repeated playback operation and a repeating start position of the user device according to the embodiment.

FIG. 18 is an explanatory view about a subtitles frame used by the user device according to the embodiment.

FIG. 22 is an explanatory view showing a display example of a dictionary display area of the user device according to the embodiment.

FIG. 25 is an explanatory view showing an example of additional information provided by the meta server according to the embodiment and added to a person.

FIG. 26 is an explanatory view illustrating an example of meta data showing a mouth position of a person provided by the meta data server according to the embodiment.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description will be provided in the order shown below:

1. Overview
2. Display Screen Configuration Example
3. Configuration of User Device
4. Subtitles Display and Playback Control Example
4-1. Overview of Subtitles Display
4-2. Operations Using Subtitles Display Area
4-3. Subtitles Frame
4-4. Analysis and Usage of Vocalization Time
4-5. Dictionary Search Function
5. Functional Configuration of Meta Data Server
6. Example of Meta Data
7. Hardware Configuration Example of Server
8. Operation Example <1. Overview>

Figure 1:
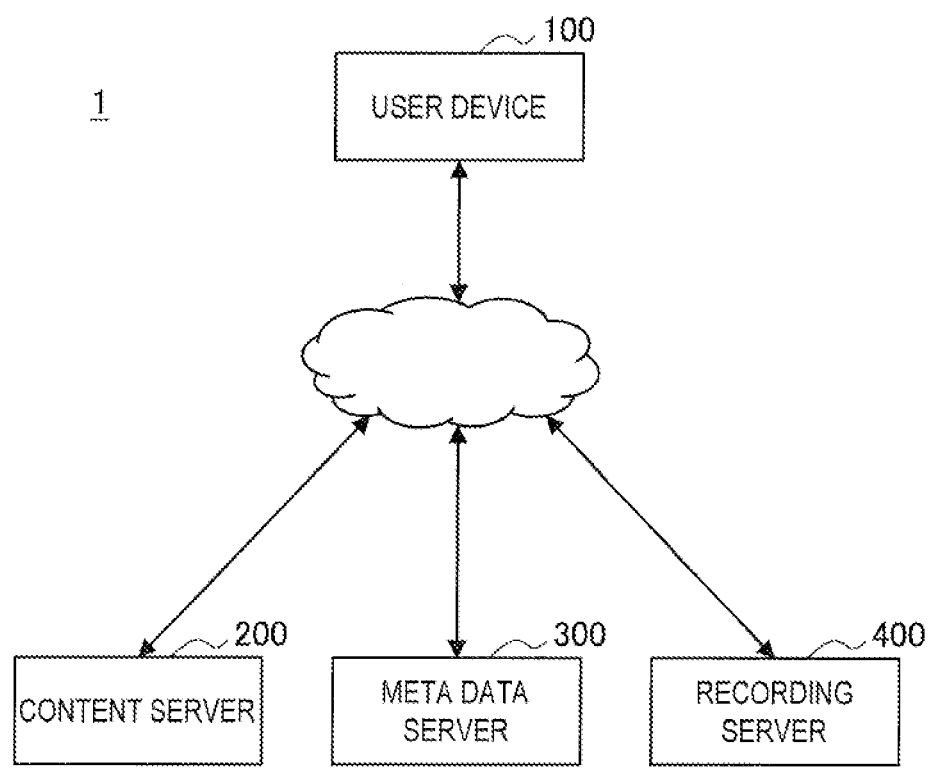
FIG. 1 is a schematic diagram of a language learning system 1 according to an embodiment of the present disclosure.

First, an overview of the language learning system 1 according to an embodiment of the present disclosure will be provided with reference to FIG. 1. FIG. 1 is a schematic diagram of the language learning system 1 according to an embodiment of the present disclosure.

To master a language that is different from one's mother tongue, it is important to continue to learn the language with interest. However, in most cases, language learning text contains only characters with abstract sentences and is difficult to understand in which circumstances a conversation is actually used and uninteresting. In this respect, it is suitable to use moving image content such as movies. Moving image content has a story, which can improve motivation to continue to learn. However, the method of learning a language using such moving images has been used as individual know-how of persons having attained proficiency in English.

Thus, the present disclosure proposes to provide moving image content in a way suitable for learning a language. New works of moving image content including movies are produced in the world one after another. Movie content has subtitles data as text of audios contained in moving image data in a common format added thereto. Thus, if a method of providing movie content is used as a method suitable for learning a language, moving image content produced one after another can be used to learn a language. In addition, by using subtitles data, a language can be learned more effectively.

In the description that follows, movie content is used as an example of moving image content. However, the present technology is not limited to such an example and may be applied to, for example, moving image content released on the Internet. In this case, subtitles data may be generated by, for example, analyzing moving image content.

Here, the configuration of the language learning system 1 according to an embodiment of the present disclosure to provide a language learning service as described above will be described with reference to FIG. 1. The language learning system 1 mainly includes a user device 100, a content server 200, a meta data server 300, and a recording server 400.

The user device 100 is a terminal device used by a user who uses the language learning service. The content server 200 is a server that provides moving image content used by the language learning service. For example, the content server 200 can transmit specified content to the user device 100 in response to a request from the user device 100. In this case, various forms in which the content server 200 provides content to the user device 100 can be considered. For example, the content server 200 may provide content to the user device 100 by streaming delivery. Alternatively, the user device 100 may download content from the content server 200.

The meta data server 300 is a server that provides meta data of moving image content. In the present embodiment, the meta data server 300 has a function to generate meta data and a function to provide meta data. The recording server 400 has a function to hold learning record information of each user. Examples of learning record information held by the recording server 400 include information about content acquired by the user, the rate of achieving a quest and acquired points described later and the like. Details of the user device 100 and the meta data server 300 will be described later.

<2. Display Screen Configuration Example>

Figure 3:
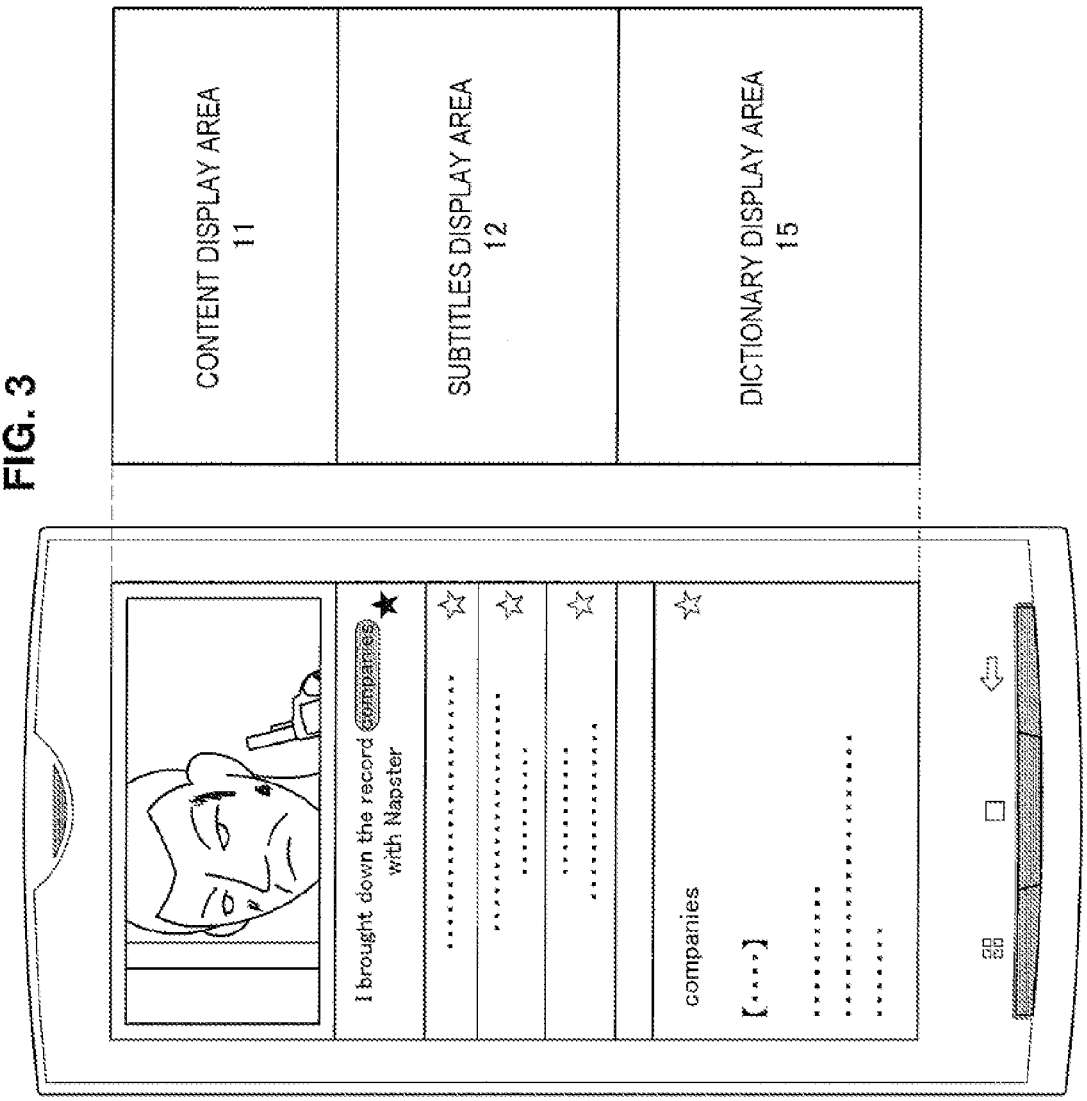
FIG. 3 is an explanatory view showing a second example of the display screen configuration provided by the language learning system according to the embodiment.

Next, a configuration example of the display screen displayed in the user device 100 by the language learning system 1 will be described with reference to FIGS. 2 and 3. FIG. 2 is an explanatory view showing a first example of a display screen configuration provided by the language learning system according to the embodiment. FIG. 3 is an explanatory view showing a second example of the display screen configuration provided by the language learning system according to the embodiment.

Referring to FIG. 2, the display screen mainly includes a content display area 11, a subtitles display area 12, a learning record display area 13, a content list display area 14, a dictionary display area 15, and a related video display area 16.

The content display area 11 is an area in which a playback screen of content is displayed. The subtitles display area 12 is an area in which subtitles added to content are displayed. As will be described in detail later, the display screen in the present embodiment can accept an operation using subtitles. Thus, the display screen is provided with the subtitles display area 12 as a separate area from the content display area 11.

The learning record display area 13 is an area in which learning record information such as a history concerning user's learning is displayed. The content list display area 14 is an area in which a list of content that can be acquired is displayed. The dictionary display area 15 is an area in which explanatory sentences about words or the like are displayed. In the dictionary display area 15, for example, explanatory sentences of words displayed in the subtitles display area 12 may be displayed. In the subtitles display area 12, for example, the user can also select words whose explanatory sentences should be displayed. The related video display area 16 is an area in which video related to the content displayed in the content display area 11 is displayed.

Next, referring to FIG. 3, a second example of the display screen configuration provided by the language learning system according to the embodiment is shown. The display screen configuration shown in the first example is suitable when the longitudinal direction of the cabinet is mainly carried in landscape orientation. The display screen configuration shown in the second example, by contrast, is suitable when, for example, the longitudinal direction of the cabinet is mainly carried in portrait orientation.

The display screen shown in the second example mainly includes the content display area 11, the subtitles display area 12, and the dictionary display area 15. Here, explanatory sentences of the word "company" selected in the subtitles display area 12 are displayed in the dictionary display area 15. The dictionary display area 15 is displayed, for example, when a word whose explanatory sentence is made to be displayed is selected and may normally be in a non-display state.

The language learning system to provide moving image content in a way suitable for learning a language as described above will be described in detail below.

<3. Configuration of User Device>

Figure 4:
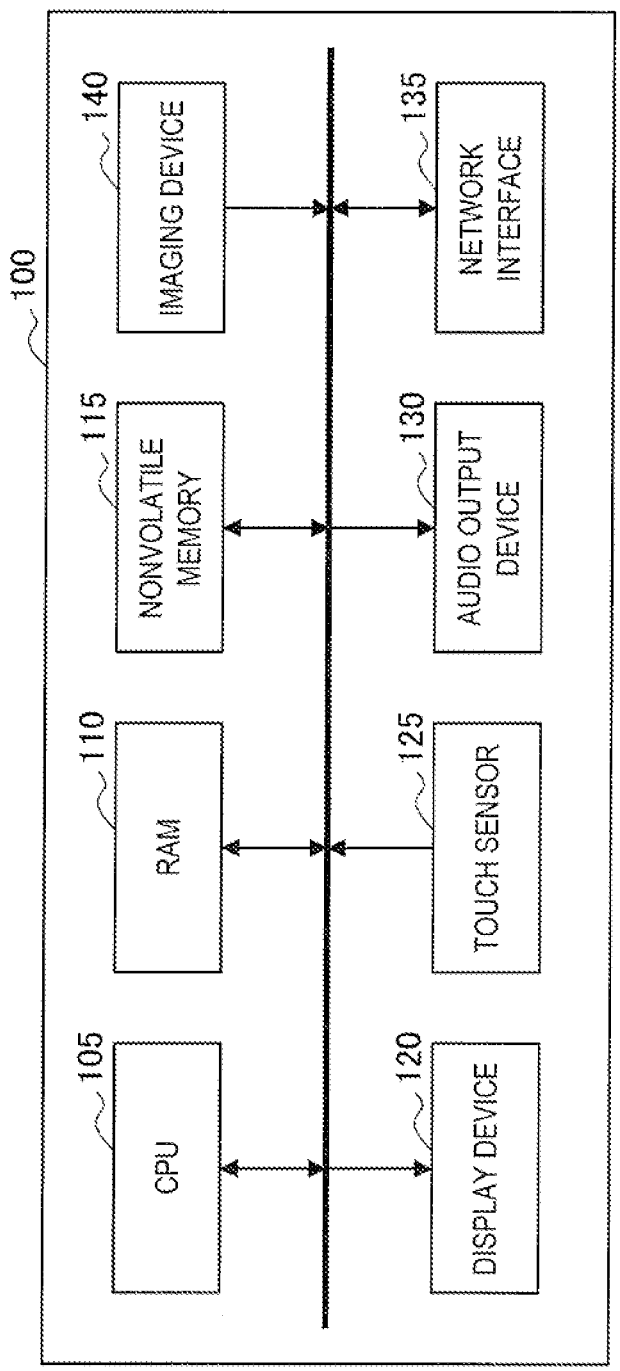
FIG. 4 is a block diagram showing a hardware configuration example of a user device according to the embodiment.
Figure 5:
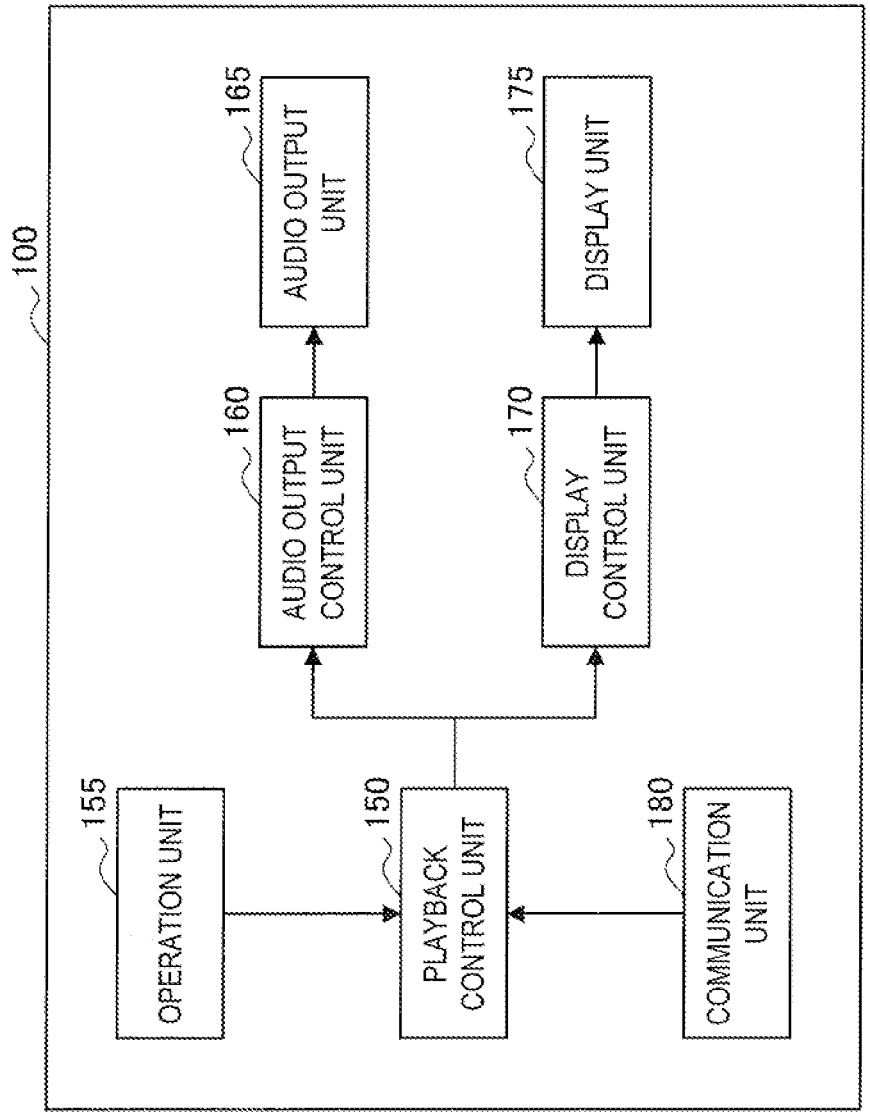
FIG. 5 is a block diagram showing a functional configuration example of the user device according to the embodiment.

Next, the configuration of the user device 100 according to an embodiment of the present disclosure will be described with reference to FIGS. 4 and 5. FIG. 4 is a block diagram showing a hardware configuration example of a user device according to the embodiment. FIG. 5 is a block diagram showing a functional configuration example of the user device according to the embodiment.

The user device 100 is an example of an information processing device that can provide the language learning service according to the embodiment of the present disclosure by executing an application, for example. The user device 100 may be, for example, an information processing device, such as a mobile phone, a personal computer (PC), a video processing device, a game machine, a household electric appliance, a music playback device, a navigation device or the like.

Referring to FIG. 4, the user device 100 mainly includes a central processing unit (CPU) 105, a random access memory (RAM) 110, a nonvolatile memory 115, a display device 120, a touch sensor 125, an audio output device 130, a network interface 135, and an imaging device 140.

The CPU 105 functions as a calculation device and a control device. The CPU 105 controls an overall operation of the user device 100 in accordance with various programs. Further, the CPU 105 may be a micro processor. The RAM 110 temporarily stores the programs that are executed by the CPU 105 and parameters etc. that vary appropriately when the programs are executed. The nonvolatile memory 115 stores the programs and operation parameters that are used by the CPU 105.

The display device 120 is an example of a display unit, and may be, for example, a liquid crystal display (LCD) device, an organic electroluminescence display (OELD) device, a cathode ray tube (CRT) display device or the like.

The touch sensor 125 is an example of an operation unit, and is provided such that it is superimposed on the display device 120. The touch sensor 125 is a position input device, and can receive an operation based on position information on a display screen.

The audio output device 130 is a speaker that outputs sounds. The audio output device 130 can output, for example, audio data of movie content being played back. The network interface 135 is an interface to connect to an external device. The network interface 135 may be an interface that connects a network via a cable or wirelessly. The imaging device 140 is a device having a function to capture moving images and still images.

Next, the functional configuration of the user device 100 according to the embodiment will be described with reference to FIG. 5. The user device 100 mainly includes the functions of a playback control unit 150, an operation unit 155, an audio output control unit 160, an audio output unit 165, a display control unit 170, a display unit 175, and a communication unit 180.

The playback control unit 150 has a function to control playback of content. The playback control unit 150 can operate based on operation information supplied from the operation unit 155. The playback control unit 150 can select content to be played back based on the operation information. The playback control unit 150 can also acquire selected content from the content server 200. Also, the playback control unit 150 can acquire meta data added to selected content from the meta data server 300. Also, the playback control unit 150 can acquire user's learning record information from the recording server 400. Also, the playback control unit 150 can control playback of content by controlling the audio output control unit 160 and the display control unit 170.

The operation unit 155 is an input device on which the user performs a desired operation, and may be the touch sensor 125, for example. The operation unit 155 can generate operation information based on an operation performed by the user, and can share the operation information with the playback control unit 150. When, for example, the user performs an operation to select content to be played back, an operation to select a playback position in the content, and an operation to set various parameters (for example, playback volume and playback speed) relating to the playback, the operation unit 155 can generate operation information in accordance with the operations.

The audio output control unit 160 can control the audio output by the audio output unit 165 in accordance with the control by the playback control unit 150. The audio output control unit 160 controls output of the audio corresponding to a specified playback section in the content specified by the playback control unit 150.

The audio output unit 165 has a function that outputs audio in accordance with the control by the audio output control unit 160. The audio output unit 165 may be the audio output device 130. Note that, here, although the user device 100 includes the audio output device 130, the present technology is not limited to this example. For example, the audio output unit 165 may be an interface that outputs audio to an external audio output device.

The display control unit 170 can control the content of a display screen that is output by the display unit 175 in accordance with the control by the playback control unit 150. The display control unit 170 can control the content of the display screen of the display unit 175 such that the specified playback section in the content specified by the playback control unit 150 is displayed.

The display unit 175 has a function that provides the user with a display screen in accordance with the control by the display control unit 170. The display unit 175 may be the display device 120. Although, here, the language learning device 100 includes the display device 120, the present technology is not limited to this example. For example, the display unit 175 may be an interface to cause an external display device to output the display screen.

The communication unit 180 has a function to communicate with an external device. The communication unit 180 may be the network interface 135. The playback control unit 150 can acquire various kinds of information from the content server 200, the meta data server 300, and the recording server 400 via the communication unit 180.

An example of the functions of the user device 100 according to the present embodiment is described above. Each of the structural elements described above may be realized by the hardware configuration shown in FIG. 4, or may be realized by using general-purpose members and circuits. Further, each of the structural elements described above may be formed by hardware dedicated to the function of each of the structural elements. Further, the function of each of the structural elements may be performed by an arithmetic device, such as a central processing unit (CPU), reading out a control program from a recording medium, such as a read only memory (ROM), a random access memory (RAM) or the like, and interpreting and executing the control program. The storage medium stores the control program in which a processing procedure to achieve these functions is described. Therefore, a configuration to be used can be changed as appropriate in accordance with a technological level when the present embodiment is carried out.

Note that a computer program to achieve each of the functions of the user device 100 according to the present embodiment described above can be created and installed in a personal computer or the like. Further, it is also possible to provide a computer-readable recording medium in which this type of computer program is stored. The recording medium is, for example, a magnetic disk, an optical disk, a magneto optical disk, a flash memory or the like. Further, the above-described computer program may be distributed, for example, via a network without using the recording medium.

<4. Subtitles Display and Playback Control Example>

Figure 7:
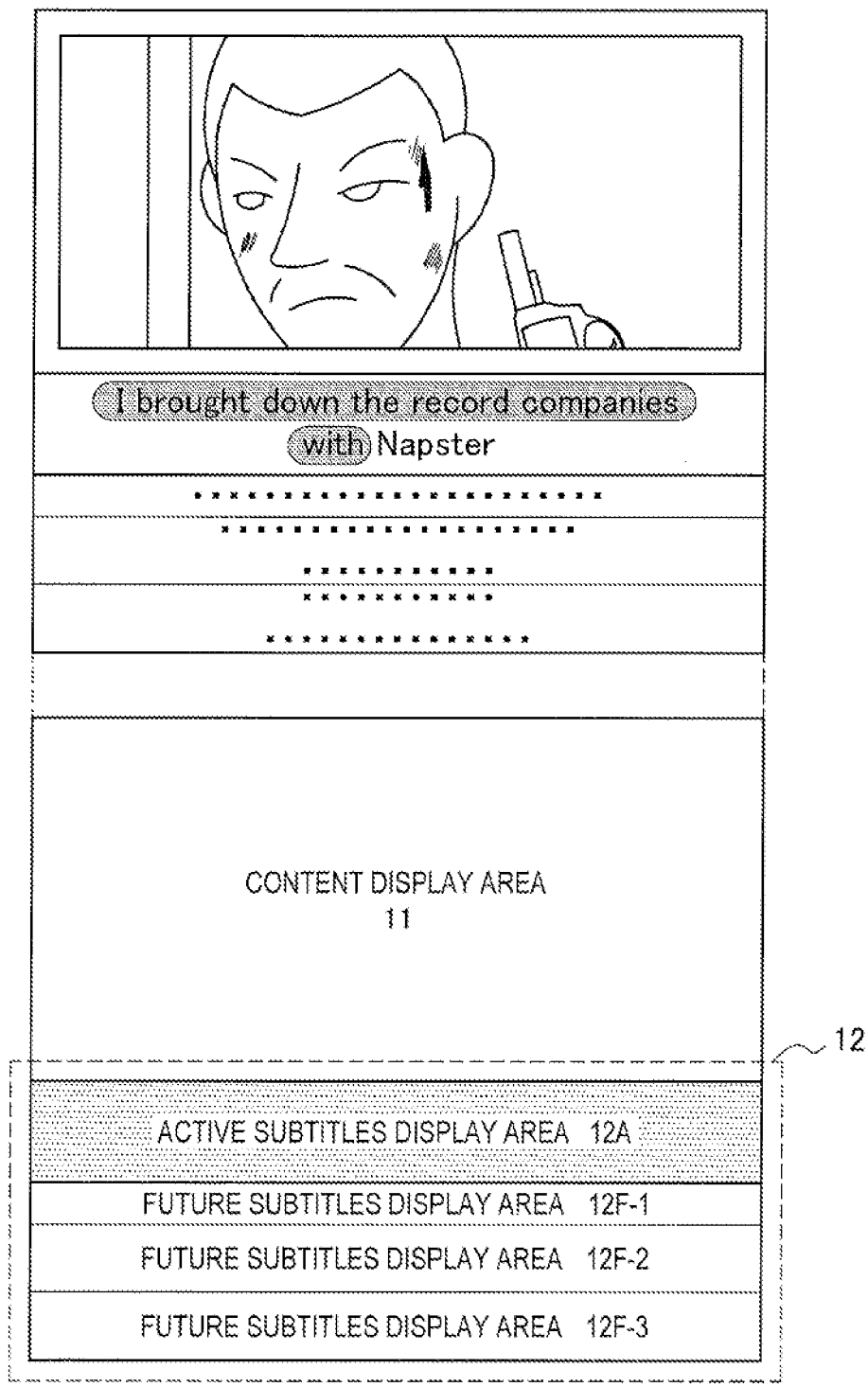
FIG. 7 is an explanatory view showing an example of the configuration of a subtitles display area displayed by the user device according to the embodiment.
Figure 8:
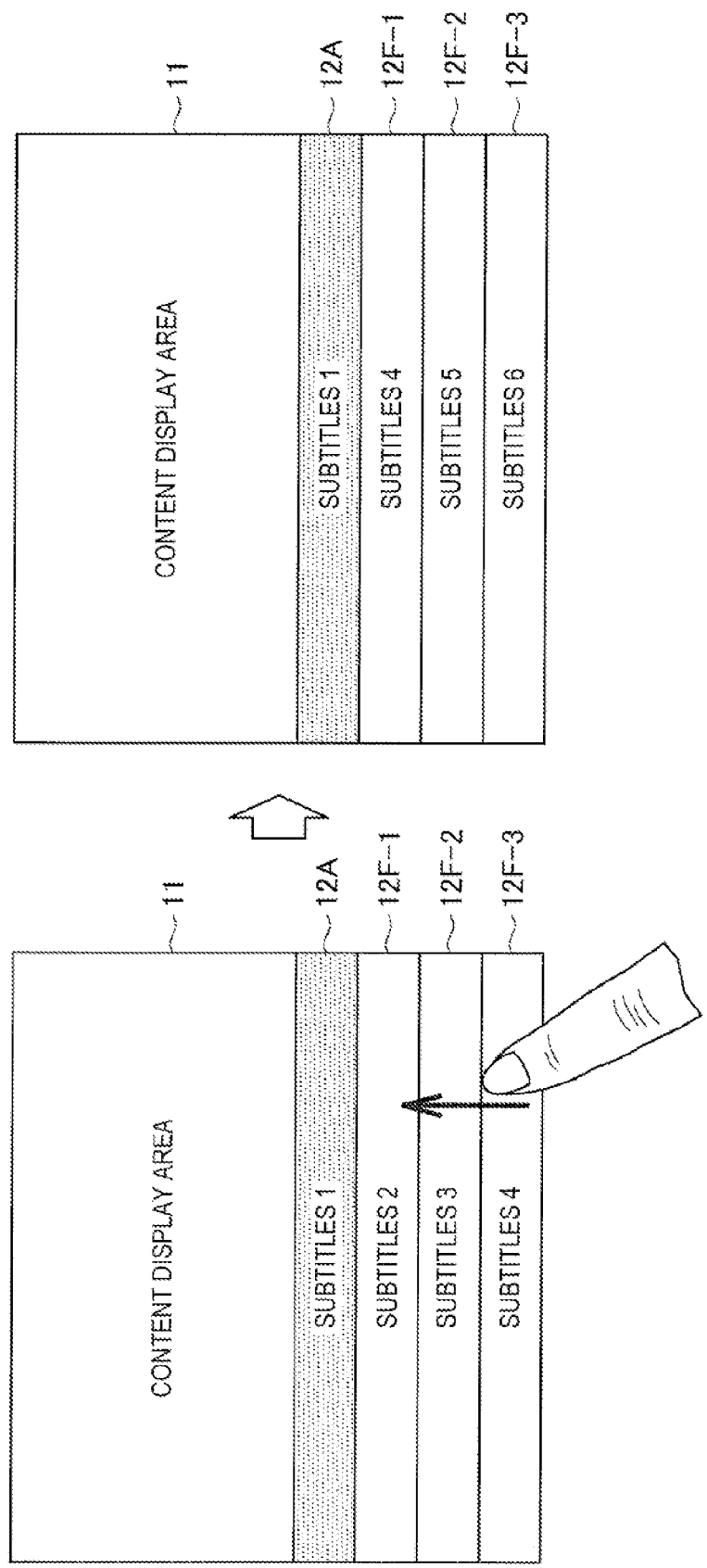
FIG. 8 is an explanatory view showing an operation example on the subtitles display area of the user device according to the embodiment.
Figure 9:
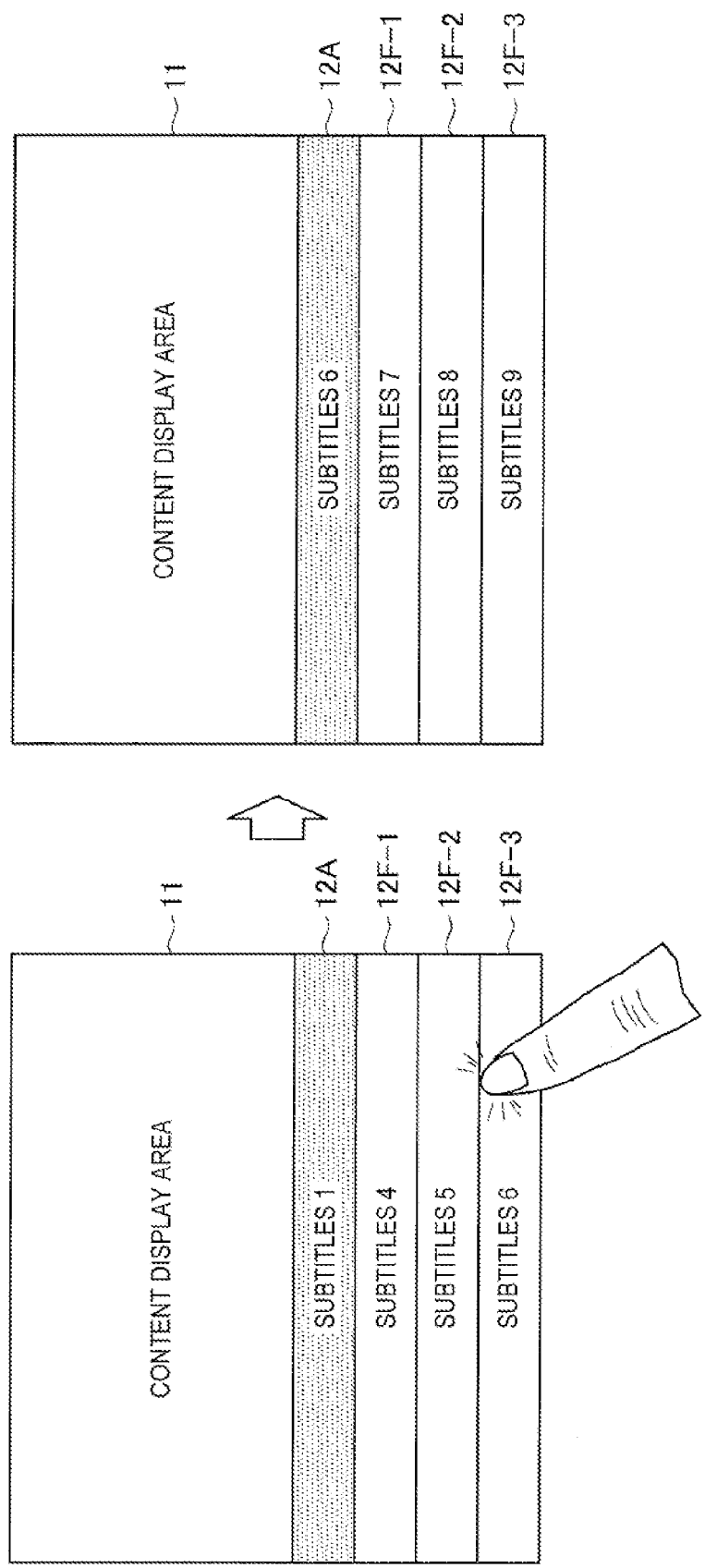
FIG. 9 is an explanatory view showing an operation example on the subtitles display area of the user device according to the embodiment.
Figure 11:
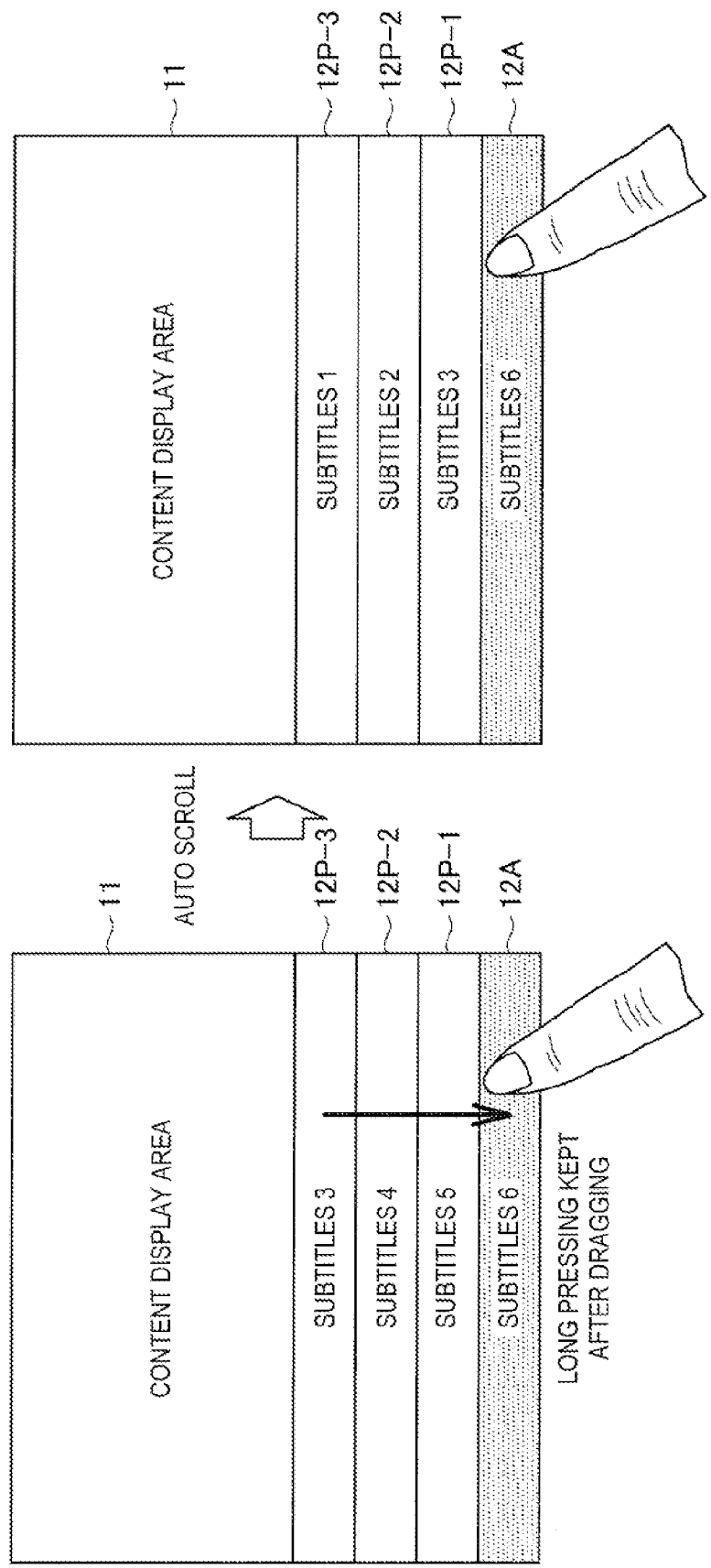
FIG. 11 is an explanatory view showing an operation example on the subtitles display area of the user device according to the embodiment.
Figure 12:
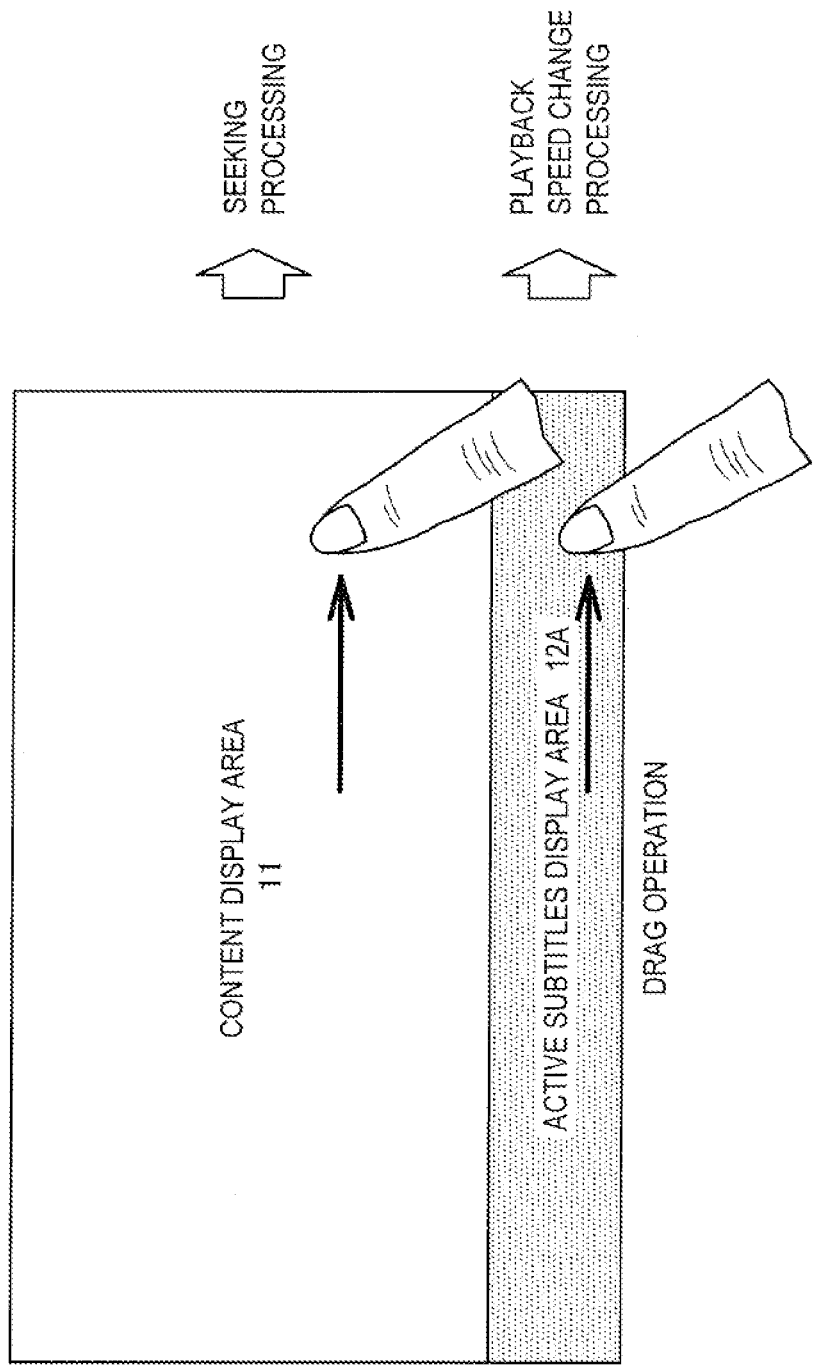
FIG. 12 is an explanatory view showing an example of an operation on a content display area and the subtitles display area of the user device according to the embodiment.
Figure 17:
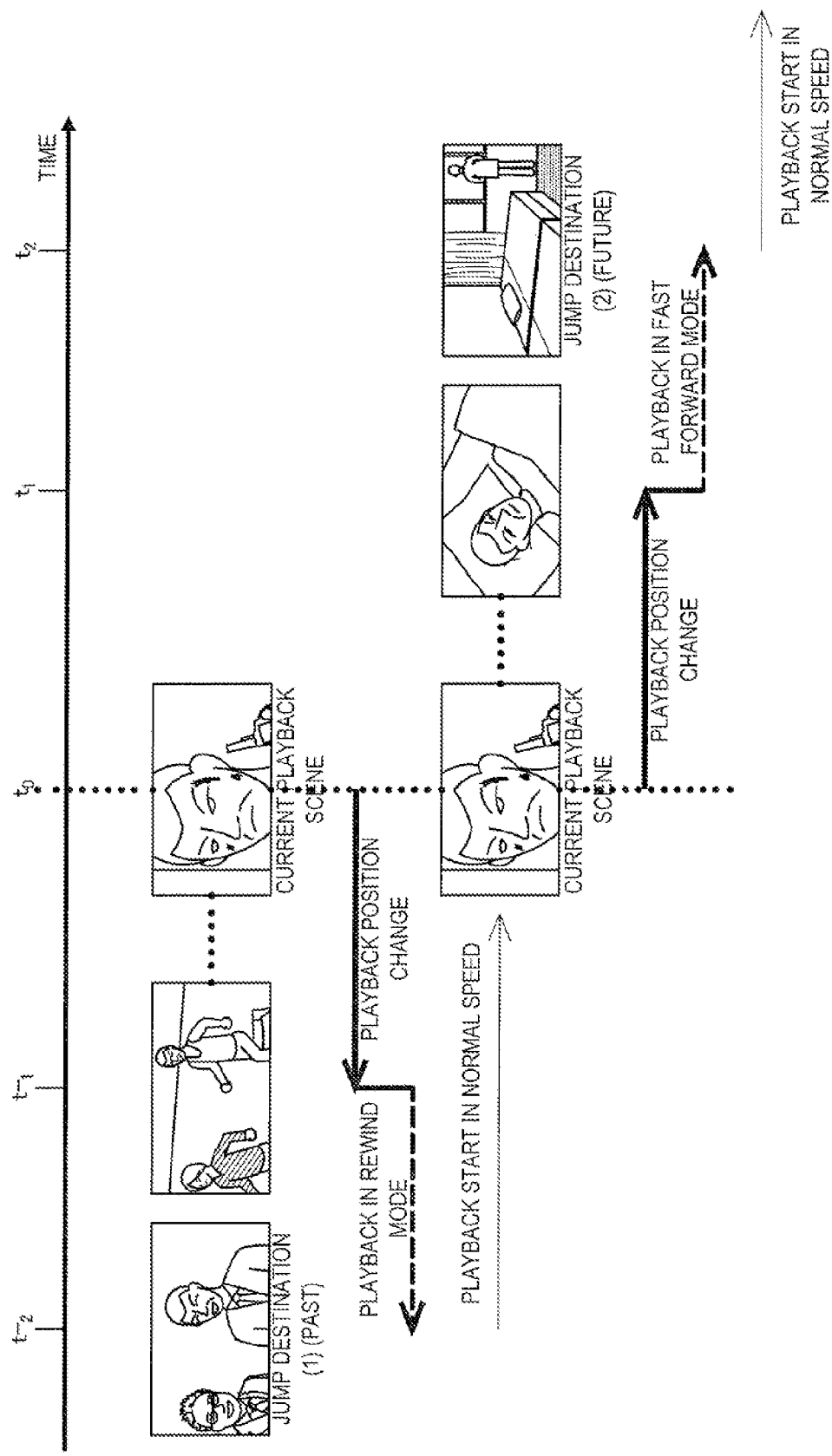
FIG. 17 is an explanatory view showing changes of a playback position and a playback method of the user device according to the embodiment.
Figure 19:
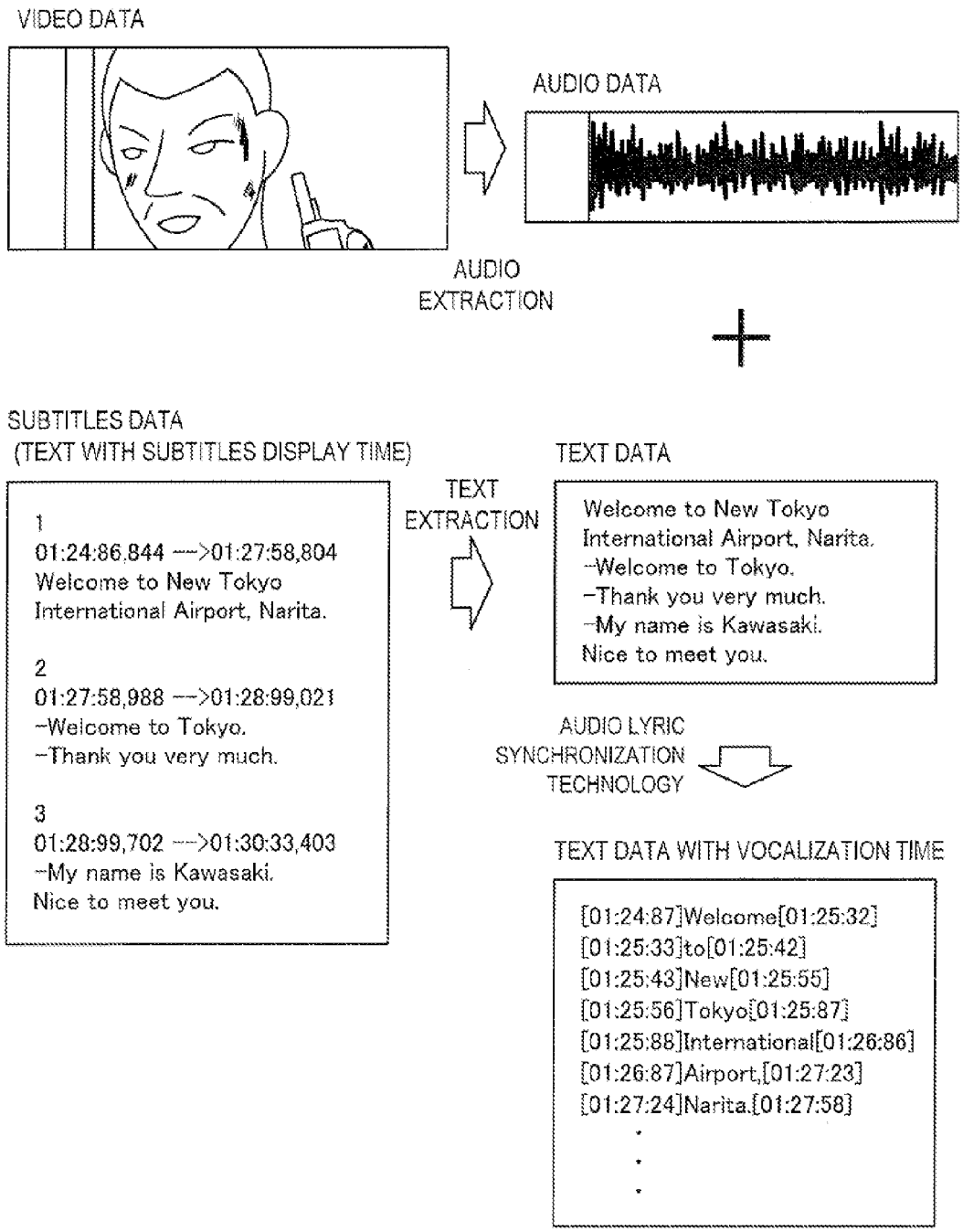
FIG. 19 is an explanatory view showing an overview of text data with a vocalization time used by the user device according to the embodiment.
Figure 20:
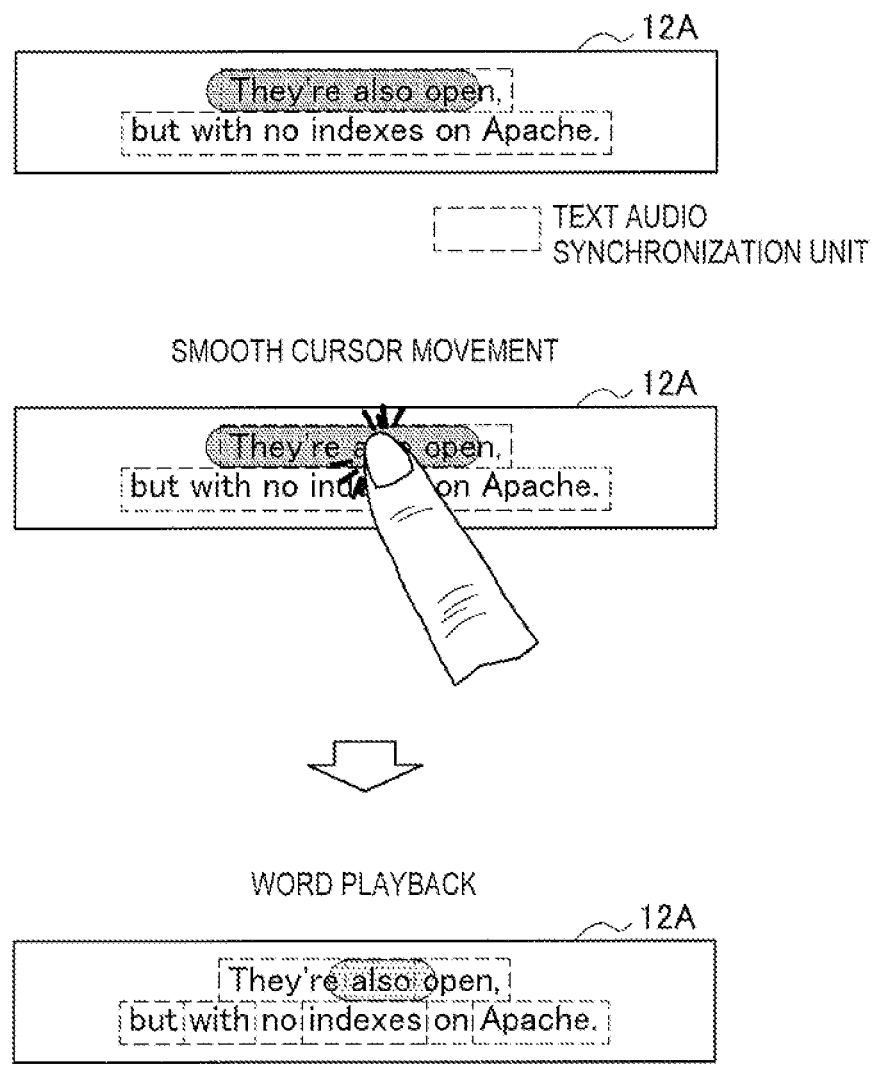
FIG. 20 is an explanatory view of switching in text audio synchronization units of the user device according to the embodiment.
Figure 21:
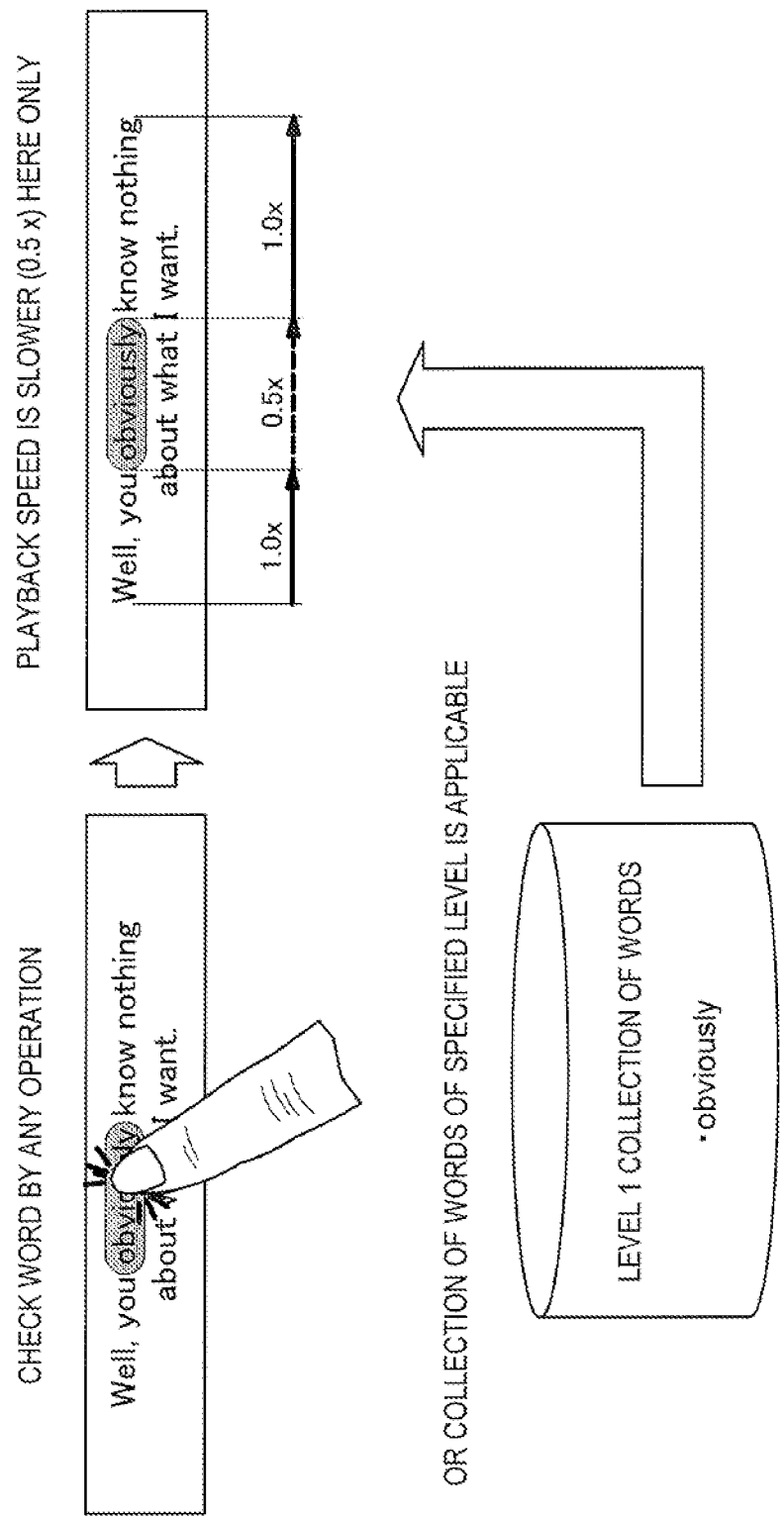
FIG. 21 is an explanatory view showing an example of how to use text data with the vocalization time used by the user device according to the embodiment.

With reference to FIGS. 6 to 22, examples of subtitles display and playback control of the user device 100 according to an embodiment of the present disclosure will be described. FIG. 6 is an explanatory view showing an example of subtitles data added to movie content played back by the user device according to the embodiment. FIG. 7 is an explanatory view showing an example of the configuration of a subtitles display area displayed by the user device according to the embodiment. FIG. 8 is an explanatory view showing an operation example on the subtitles display area of the user device according to the embodiment. FIG. 9 is an explanatory view showing an operation example on the subtitles display area of the user device according to the embodiment. FIG. 10 is an explanatory view showing an operation example on the subtitles display area of the user device according to the embodiment. FIG. 11 is an explanatory view showing an operation example on the subtitles display area of the user device according to the embodiment. FIG. 12 is an explanatory view showing an example of an operation on a content display area and the subtitles display area of the user device according to the embodiment. FIG. 13 is an explanatory view showing an example of a playback speed operation by an active subtitles display area of the user device according to the embodiment. FIG. 14 is an explanatory view showing an example of a repeated playback operation of the user device according to the embodiment. FIG. 15 is an explanatory view showing variation of the repeated playback operation and a corresponding playback speed of the user device according to the embodiment. FIG. 16 is an explanatory view illustrating an example of a relationship between a tap position of the repeated playback operation and a repeating start position of the user device according to the embodiment. FIG. 17 is an explanatory view showing changes of a playback position and a playback method of the user device according to the embodiment. FIG. 18 is an explanatory view about a subtitles frame used by the user device according to the embodiment. FIG. 19 is an explanatory view showing an overview of text data with a vocalization time used by the user device according to the embodiment. FIG. 20 is an explanatory view of switching in text audio synchronization units of the user device according to the embodiment. FIG. 21 is an explanatory view showing an example of how to use text data with the vocalization time used by the user device according to the embodiment. FIG. 22 is an explanatory view showing a display example of a dictionary display area of the user device according to the embodiment.

[4-1. Overview of Subtitles Display]

First, an overview of the subtitles display of the user device 100 according to the embodiment will be provided with reference to FIGS. 6 and 7. In FIG. 6, an example of subtitles data added to movie content is shown.

The subtitles data contains, for example, the subtitles ID, subtitles display time, and subtitles text. The subtitles ID is a symbol that identifies a chunk of subtitles text displayed on the screen at a time. For example, a serial number in time sequence may be added as the subtitles ID. The subtitles display time is a time during which subtitles text is displayed. The subtitles text is text data displayed together with playback of movie content.

Using such subtitles data, the display control unit 170 of the user device 100 can cause the subtitles display area 12 in the display screen to display subtitles text. The subtitles display area 12 is provided, as shown in FIG. 7, below the content display area 11 and can contain an active subtitles display area 12A and a future subtitles display area 12F. The active subtitles display area 12A is an area in which the active subtitles corresponding to the playback time point of content currently being played back in the content display area 11 is displayed. In contrast, the future subtitles display area 12F is an area in which future subtitles corresponding to scenes that will be played back are displayed. When no operation is performed by the user, for example, the active subtitles display area 12A may be displayed in the top end of the subtitles display area 12 followed by the future subtitles display area 12F subsequent to the active subtitles below the active subtitles display area 12A. While three future subtitles display areas, a future subtitles display area 12F-1, a future subtitles display area 12F-2, and a future subtitles display area 12F-3, are displayed, the number of the displayed future subtitles display areas 12F may vary depending on the state of display and the size of the display screen. A cursor indicating the current playback position is displayed by being superimposed on the subtitles displayed in the active subtitles display area 12A.

The display screen of the user device 100 has an area to display the subtitles and an area to display video of content separately. Thus, various operations can be accepted for a chunk of subtitles as a unit and also the display screen can be controlled based on such operations. Hereinafter, various operations on the display screen and the control of the display screen based on such operations will be described by showing concrete examples.

[4-2. Operations Using Subtitles Display Area]

Here, a seeking operation using the subtitles display area will be described with reference to FIGS. 8 to 11. As described above, the display screen displayed by the user device 100 contains the subtitles display area 12 that accepts the selection for each chunk of subtitles. The drawing used for description here is shown by portions to be described being extracted. Therefore, the display screen does not necessarily have the screen configuration shown in the drawing.

In the left figure of FIG. 8, the active subtitles display area 12A, the future subtitles display area 12F-1, the future subtitles display area 12F-2, and the future subtitles display area 12F-3 are displayed below the content display area 11. Also, subtitles 1 are displayed in the active subtitles display area 12A, subtitles 2 are displayed in the future subtitles display area 12F-1, subtitles 3 are displayed in the future subtitles display area 12F-2, and subtitles 4 are displayed in the future subtitles display area 12F-3. If, in this state, the user performs a drag operation in a direction in which the future subtitles display areas 12F are arranged (in an up and down direction in the figure) on the future subtitles display areas 12F, content of subtitles displayed in the future subtitles display areas 12F is changed. For example, as shown in the right figure of FIG. 8, subtitles 4 may be displayed in the future subtitles display area 12F-1, subtitles 5 may be displayed in the future subtitles display area 12F-2, and subtitles 6 may be displayed in the future subtitles display area 12F-3. At this point, the subtitles displayed in the active subtitles display area 12A remains the subtitles 1 and are not changed. It is assumed here that the number attached to the subtitles is a serial number in time sequence. That is, the subtitles 2 are subtitles displayed immediately after the subtitles 1.

The future subtitles display area 12F can also accept a change operation of the playback position. For example, as shown in the left figure of FIG. 9, a scene in which the subtitles 1 are displayed in the active subtitles display area 12A, the subtitles 4 are displayed in the future subtitles display area 12F-1, the subtitles 5 are displayed in the future subtitles display area 12F-2, and the subtitles 6 are displayed in the future subtitles display area 12F-3 is assumed. If, at this point, a tap operation is performed on the future subtitles display area 12F-3 in which the subtitles 6 are displayed, the subtitles displayed in the tapped place, that is, the subtitles 6 are displayed in the active subtitles display area 12A. At this point, subtitles subsequent to the subtitles displayed in the active subtitles display area 12A are in turn displayed in the future subtitles display areas 12F. More specifically, when the subtitles 6 are displayed in the active subtitles display area 12A, subtitles 7 are displayed in the future subtitles display area 12F-1, subtitles 8 are displayed in the future subtitles display area 12F-2, and subtitles 9 are displayed in the future subtitles display area 12F-3.

Also, the display position of the active subtitles display area 12A is changed by a drag operation on the active subtitles display area 12A. For example, as shown in the left figure of FIG. 10, a case in which the subtitles 6 are displayed in the active subtitles display area 12A, the subtitles 7 are displayed in the future subtitles display area 12F-1, the subtitles 8 are displayed in the future subtitles display area 12F-2, and the subtitles 9 are displayed in the future subtitles display area 12F-3 is assumed. If, in this case, a drag operation from the active subtitles display area 12A that the subtitles 6 are displayed in the direction in the future subtitles display areas 12F are arranged is accepted, the display position of the active subtitles display area 12A is changed in accordance with the drag operation (right figure of FIG. 10). At this point, a past subtitles display area 12P is displayed in an upper part of the active subtitles display area 12A. In the past subtitles display area 12P, subtitles positioned chronologically prior to the active subtitles displayed in the active subtitles display area 12A are displayed. More specifically, for example, as shown in the right figure of FIG. 10, when the subtitles 6 are displayed in the active subtitles display area 12A, the subtitles 4 may be displayed in a past subtitles display area 12P-2, the subtitles 5 may be displayed in a past subtitles display area 12P-1, and the subtitles 7 may be displayed in the future subtitles display area 12F-1.

When, as shown in FIG. 11, a drag operation is performed on the active subtitles display area 12A and the active subtitles display area 12A reaches the bottom end of the subtitles display area 12, if a state of a long pressing operation is kept for the active subtitles display area 12A, the operation may be recognized as an auto scroll operation. In this case, while the long pressing operation on the active subtitles display area 12A continues, subtitles displayed in the past subtitles display area 12P displayed above the active subtitles display area 12A are automatically scrolled. For example, as shown in the right figure of FIG. 11, the subtitles 1 may be displayed in a past subtitles display area 12P-3, the subtitles 2 may be displayed in the past subtitles display area 12P-2, and the subtitles 3 may be displayed in the past subtitles display area 12P-1.

As described above, the user device 100 according to the present embodiment can perform seeking processing of content by an operation on the subtitles display area 12. The user device 100 can also change the playback position in accordance with an operation on the subtitles display area 12. While, for example, in FIG. 8, a drag operation on the future subtitles display area 12F is described, a similar operation may also be performed on the past subtitles display area 12P. In addition, in FIG. 9, that the playback position can be changed by a tap operation on the future subtitles display area 12F is described, but a similar operation may also be performed on the past subtitles display area 12P. The auto scroll processing described with reference to FIG. 11 can also be applied to auto scroll processing of future subtitles in a top end portion of the subtitles display area 12.

The display screen of the user device 100 can have, as described above, a plurality of display areas including the content display area 11 and the subtitles display area 12 for one content. The playback control unit 150 can recognize a different operation from display area to display area. For example, when, as shown in FIG. 12, a drag operation is detected in the content display area 11, the playback control unit 150 can recognize the drag operation as an operation to perform seeking processing. When a drag operation is detected in the active subtitles display area 12A, the playback control unit 150 can recognize the drag operation as an operation to perform playback speed change processing. When, for example, a drag operation from left to right in the active subtitles display area 12A is detected, the playback control unit 150 can recognize the drag operation as an operation to accelerate the playback speed. Also when a drag operation from right to left in the active subtitles display area 12A is detected, the playback control unit 150 can recognize the drag operation as an operation to decelerate the playback speed. An example of the display control at this point is displayed in FIG. 13. When, for example, a drag operation in the right direction is detected, the display control unit 170 automatically scrolls the background in the right direction and accelerates the cursor speed in accordance with the acceleration of the playback speed. It is desirable for the background to contain a pattern to allow the user to grasp the direction so that the moving direction of the background can be understood. When a drag operation in the left direction is detected, the display control unit 170 automatically scrolls the background in the left direction and decelerates the cursor speed in accordance with the deceleration of the playback speed.

Also, a repeat operation shown in FIG. 14 can be cited as an operation on the active subtitles display area 12A. When, for example, a tap operation on the active subtitles display area 12A is detected, repeated playback is performed from the location corresponding to the beginning of the subtitles displayed in the active subtitles display area 12A. As shown in FIG. 15, the playback speed may be changed depending on the type of repeat operation. Repeated playback may be performed in normal speed when, for example, the repeat operation is a single tap, slow playback may be performed when the repeat operation is a long pressing operation, and high-speed playback may be performed when the repeat operation is a double tap.

When the tap position is specified by an operation performed during playback, the position desired by the user and the actually detected tap position may be separated. For example, the tap position may be past the interval of the subtitles 1 when the user tries to perform the repeated playback of the subtitles 1. In such a case, the playback starts with the subtitles 2. The playback control to avoid such inconvenience will be described with an illustration in FIG. 16. For example, in Pattern 1, the tap position is detected halfway through the subtitles 1. In this case, the playback control unit 150 performs repeated playback from the beginning of the subtitles 1. In Pattern 2, the tap position is detected at the beginning of the subtitles 2 within a predetermined period TP after the end of playback of the subtitles 1. In this case, the playback control unit 150 performs repeated playback from the beginning of the subtitles 1 by judging that the user desires repeated playback of the subtitles 1. In Pattern 3, a predetermined time interval is provided between the subtitles 1 and the subtitles 2. In this case, the tap position is detected within the predetermined period TP after the end of playback of the subtitles 1 and before playback of the subtitles 2 is started. In this case, the playback control unit 150 performs repeated playback from the beginning of the subtitles 1 by judging that the user desires repeated playback of the subtitles 1. In Pattern 4 in which though the tap position is at the beginning of the subtitles 2, the predetermined time interval is provided between the subtitles 1 and the subtitles 2 and the tap position is not within the predetermined period TP after the end of playback of the subtitles 1, the playback control unit 150 performs repeated playback of the subtitles 2. Due to such playback control, even if a tap operation by the user is delayed, repeated playback can be performed from the appropriate position.

When the playback position is changed by an operation on the subtitles display area 12, the playback position jumps and thus, when compared with a case in which the playback position is searched in rewind or fast forward mode, the position on the time axis of the playback position may be hard to find. Therefore, the playback control unit 150 can start playback in normal speed from the jump destination point after fast playback from a little before the jump destination point to the jump destination point. A concrete description will be provided using the example in FIG. 17. The point of the current playback scene is assumed to be point $t_0$. When jumping to past point $t_{-2}$ viewed from $t_0$, the playback control unit 150 plays back an interval from point $t_{-1}$, which is a little before point $t_{-2}$, to point $t_{-2}$ in rewind mode. Then, when point $t_{-2}$ is reached, playback in normal speed is started. Based on playback in rewind mode from point $t_{-1}$ to point $t_{-2}$, the user can understand that point $t_{-2}$ is a past point when viewed from point $t_0$. When jumping to future point $t_2$ viewed from $t_0$, the playback control unit 150 plays back an interval from point $t_1$, which is a little before point $t_2$, to point $t_2$ in fast forward mode. Then, when point $t_2$ is reached, playback in normal speed is started. Based on playback in fast forward mode from point $t_1$ to point $t_2$, the user can understand that point $t_2$ is a future point when viewed from point $t_0$.

[4-3. Subtitles Frame]

Subsequently, a subtitles frame used by the user device 100 will be described with reference to FIG. 18. Video content has frequently been dealt with in the time frame unit of milliseconds. In contrast, the present disclosure proposes to deal with video content in subtitles frame units fitting to chunks of subtitles. While the time frame is delimited in constant time units regardless of details of content, the subtitles frame is a frame delimited by each chunk of subtitles as a unit. Subtitles are delimited based on the meaning of conversation in content. Thus, the subtitles frame is suitable as a playback start position. Therefore, the playback control unit 150 of the user device 100 can adjust the playback start position to the start position of a subtitles frame.

For example, FIG. 18 shows an example in which the playback start position is adjusted when, after a pause operation is performed, a play operation is performed. In this case, the playback control unit 150 may set the start position of a subtitles frame in which the pause point is contained as the playback start position. FIG. 18 also shows an example in which the playback start position is specified by a seeking operation. When the playback start position is specified by a seeking operation, the playback control unit 150 can set the start position of a subtitles frame in which the specified playback start position is contained as the playback start position. By adopting such a configuration, the playback start point becomes a point in content that is good to start and so the user can more easily understand details of content.

[4-4. Analysis and Usage of Vocalization Time]

The analysis of vocalization time of subtitles data and usage thereof will be described with reference to FIGS. 19 to 22. As described above, the user device 100 can use subtitles data containing the subtitles ID, subtitles display time, and subtitles text. The subtitles display time shows the display start time and the display end time by viewing subtitles text as a chunk. The display start time is frequently set a little earlier than vocalization of subtitles text is actually started and the display end time is frequently set a little later than vocalization of subtitles text actually ends.

Thus, the present disclosure uses text data with the vocalization time generated by audio lyric synchronization technology using subtitles text extracted from the subtitles data and audio data extracted from video data. The text data with the vocalization time is data to which the time when words of text data is actually vocalized is analyzed and attached. For example, as shown in FIG. 19, the actual vocalization time is attached in word units. The text data with the vocalization time is provided from the meta data server 300.

By using the text data with the vocalization time, the playback control unit 150 of the user device 100 can grasp the time when each word in the subtitles is vocalized. If the position of the cursor displayed by being superimposed on the subtitles in the active subtitles display area 12A is controlled by using the time when each word is vocalized using, for example, text data with the vocalization time, the display control unit 170 can match the time of vocalization and the cursor position more accurately. However, if the audio and the cursor position are matched accurately in word units, the moving speed of the cursor displayed on subtitles data as a chunk changes and the movement thereof is not smooth. The cursor whose moving speed changes may evoke user's displeasure by reducing visibility for the user and in addition, when viewing normal content, the user does not demand such correctness of synchronization of text and audios. Thus, when normal content is played back, as shown in the upper figure of FIG. 20, the display control unit 170 can use the sentence unit as the synchronization unit of text and audio.

If, as shown in the middle figure of FIG. 20, an operation to select a portion of the displayed subtitles text is performed in the active subtitles display area 12A, the playback control unit 150 can identify the selected portion in word units. In this case, the operation to select a portion in subtitles text may be, for example, a tap operation. The playback control unit 150 can switch the synchronization unit of text and audio in accordance with the tap operation. If, for example, a word in the subtitles text is selected, the playback control unit 150 causes the cursor to be displayed by being superimposed on the selected word portion and causes output of the voice of the selected word (lower figure of FIG. 20). By switching the synchronization unit of audio and text in this manner, the screen display and audio output appropriate for circumstances can be realized.

In addition, the playback speed of only a specific word can be changed by being able to identify the vocalization time in word units. For example, if, as shown in FIG. 21, a word is selected by any operation in advance, the playback control unit 150 may change the playback speed of only the selected word. If, for example, the playback speed of only the selected word is slowed down, the pronunciation of only a specific word can be checked during playback by selecting only the word whose pronunciation is desired to be checked by the user in advance. Words whose playback speed is changed are not limited to words selected by the user. For example, the playback control unit 150 may change the playback speed of words contained in a specified collection of words. If a word contained in the collection of words is contained in subtitles text, the playback control unit 150 can slow down the playback speed during the vocalization time of the applicable word. If, for example, the collection of words is edited for each level, the user can view content while checking pronunciations of words of the level appropriate to each user only by selecting the level.

[4-5. Dictionary Search Function]

As described above, explanatory sentences of words contained in subtitles text are displayed in the dictionary display area 15. For example, the display control unit 170 can display explanatory sentences of a word selected in the active subtitles display area 12A by the user in the dictionary display area 15. However, the user may want to know, instead of the meaning of a word, the meaning of a phrase of a plurality of words or an idiom. When explanatory sentences of a selected word are simply displayed, however, a plurality of words cannot be selected. If a plurality of words is simply made selectable, the probability that no applicable sentence is present increases, which decreases the convenience of users.

Thus, as shown in FIG. 22, the display control unit 170 can highlight words that can form a phrase based on the selected word. Then, the playback control unit 150 determines that only the highlighted words are in a state capable of accepting the selection by the user. For example, the display control unit 170 can highlight, after a verb is selected, a preposition adjacent to the selected verb. For example, if a portion of "took" in subtitles text of " . . . he took up with my cousin . . . " as shown in FIG. 22 is selected, the display control unit 170 highlights "up" and "with" adjacent to "took". If the preposition adjacent to a verb is further adjacent to a preposition like in this case, the display control unit 170 can select and highlight a plurality of prepositions. Then, if the user performs an operation to select the highlighted prepositions, the display control unit 170 can display explanatory sentences of "took up with" in the dictionary display area 15.

<5. Functional Configuration of Meta Data Server>

Figure 23:
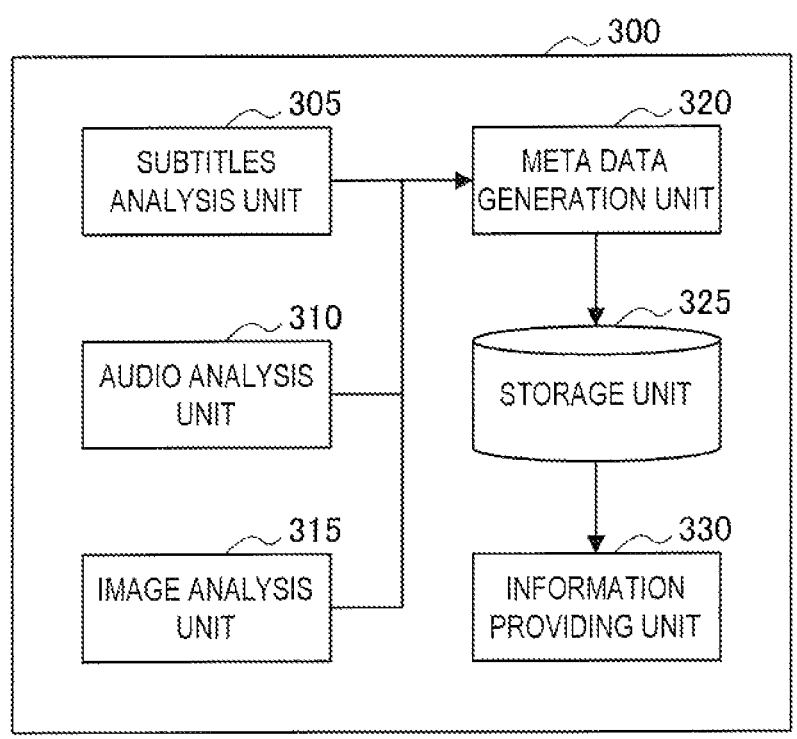
FIG. 23 is a block diagram showing a functional configuration of a meta data server according to the embodiment.

Next, the functional configuration of the meta data server 300 according to an embodiment of the present disclosure will be described with reference to FIG. 23. FIG. 23 is a block diagram showing a functional configuration of a meta data server according to the embodiment.

The meta data server 300 mainly includes a subtitles analysis unit 305, an audio analysis unit 310, an image analysis unit 315, a meta data generation unit 320, a storage unit 325, and an information providing unit 330.

The subtitles analysis unit 305 has a function to analyze subtitles data. The subtitles analysis unit 305 can analyze subtitles data contained in, for example, subtitles data.

The audio analysis unit 310 has a function to analyze audio data contained in content. The audio analysis unit 310 can provide characteristic information of audio data by analyzing audio data contained in content.

The image analysis unit 315 has a function to analyze image data contained in content. The image analysis unit 315 can generate information such as the position, type and the like of an object contained in image data by using, for example, an object recognition technology. The image analysis unit 315 can recognize, for example, the position of a person contained in image data. The image analysis unit 315 can also recognize the position of the face and the position of the mouth of a person contained in image data. The image analysis unit 315 can also recognize a person contained in image data. Therefore, the image analysis unit 315 can provide information about a person recognized as the same person by analyzing persons contained in each piece of image data. The image analysis unit 315 can also recognize the orientation, for example, the orientation of the face of a person contained in image data by analyzing the image data.

The meta data generation unit 320 has a function to generate meta data on content based on analysis results of subtitles data by the subtitles analysis unit 305, analysis results of audio data by the audio analysis unit 310, and analysis results of image data by the image analysis unit 315. The meta data generation unit 320 can cause the storage unit 325 to store the generated meta data.

The storage unit 325 is a device for data storage and can include storage media, recording devices recording data in storage media, reading devices reading data from storage media, deleting devices deleting data from storage media. As storage media, for example, a flash memory, a nonvolatile memory such as MRAM (Magnetoresistive Random Access Memory), FeRAM (Ferroelectric Random Access Memory), PRAM (Phase change Random Access Memory), and EEPROM (Electronically Erasable and Programmable Read Only Memory), a magnetic recording medium such as HDD (Hard Disk Drive) or the like may be used.

The information providing unit 330 has a function to provide meta data of content in response to a request. For example, the information providing unit 330 can provide text audio synchronization information of specific content. The information providing unit 330 can also provide a search function across content. When, for example, a search keyword is received, the information providing unit 330 can extract content containing words containing the search keyword from all content dealt with by using subtitles text.

<6. Example of Meta Data>

Figure 24:
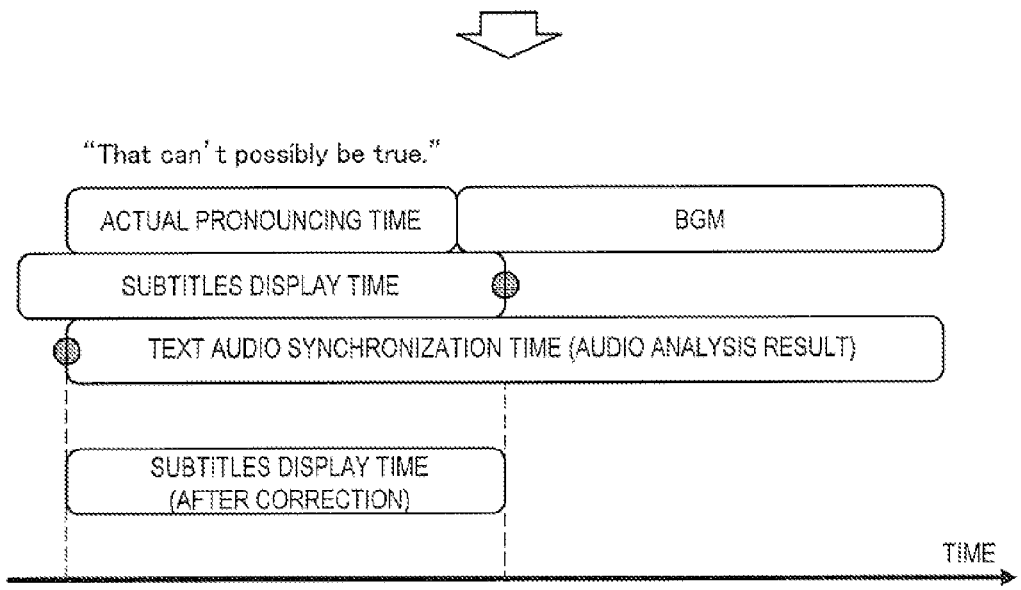
FIG. 24 is an explanatory view of correcting a subtitles display time of the meta server according to the embodiment.
Figure 27:
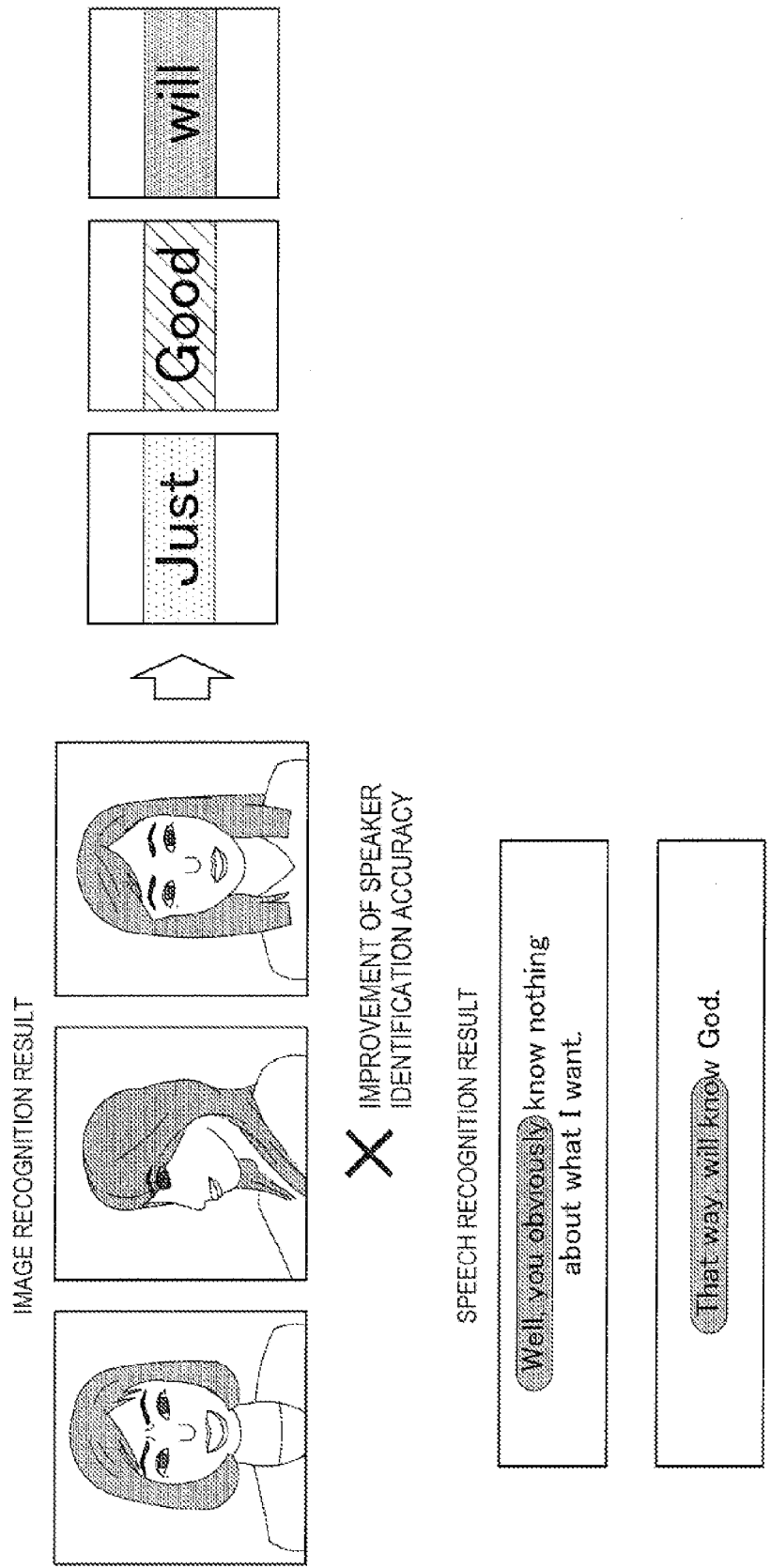
FIG. 27 is an explanatory view showing an example of person recognition information provided by the meta data server according to the embodiment.
Figure 28:
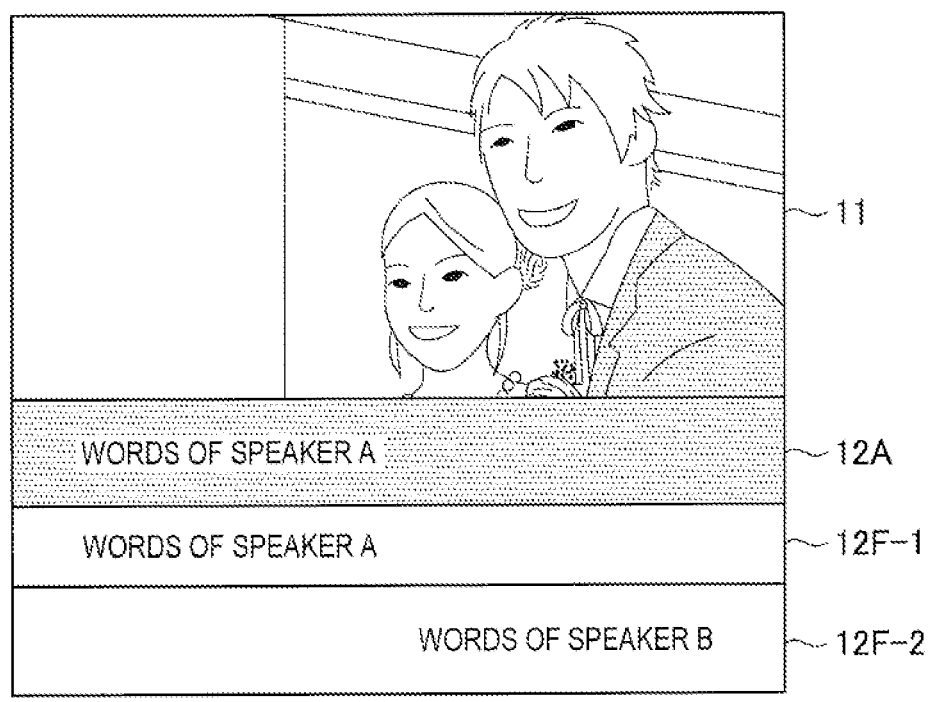
FIG. 28 is an explanatory view showing an example of subtitles display in accordance with a speaker in the user device according to the embodiment.
Figure 29:
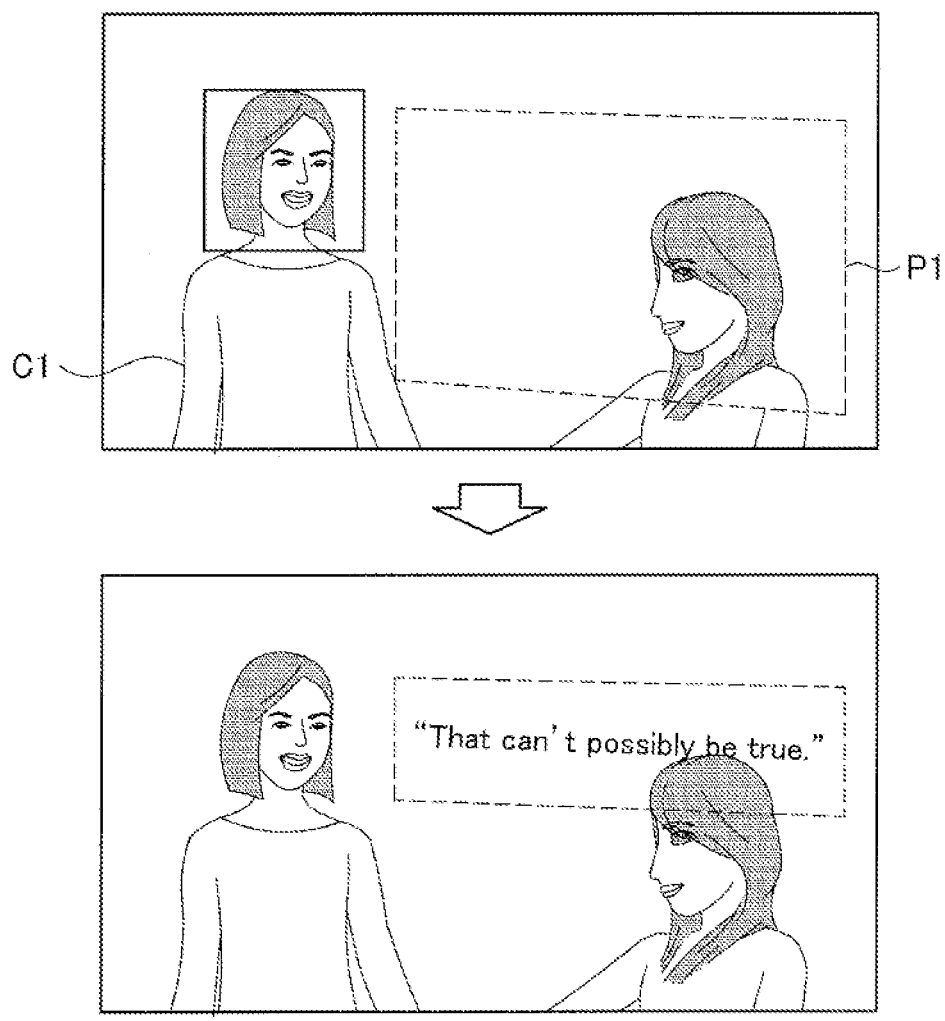
FIG. 29 is an explanatory view showing an example of word display using meta data provided by the meta data server according to the embodiment.
Figure 30:
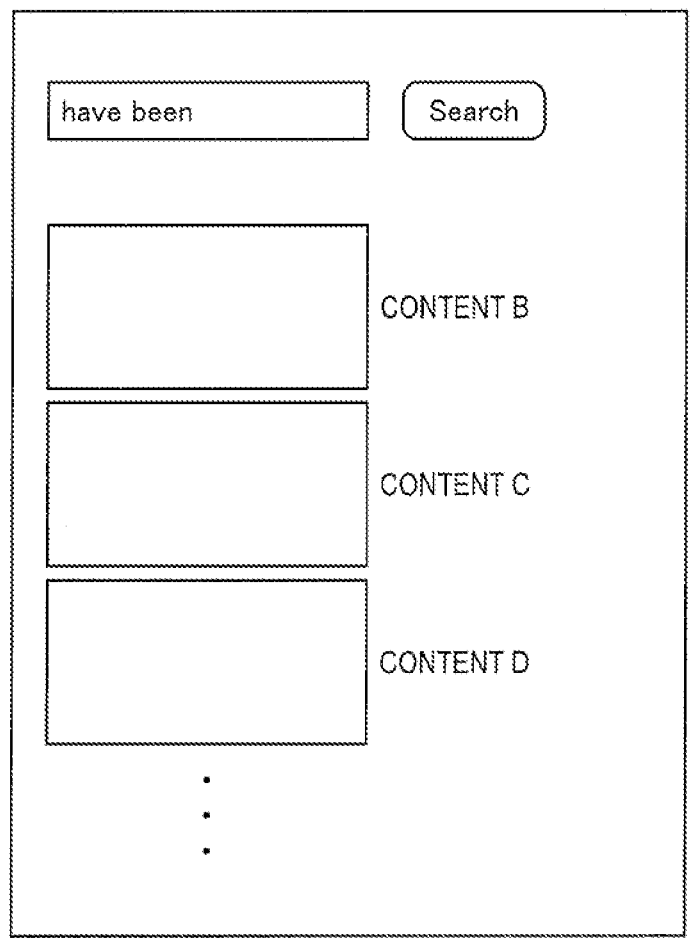
FIG. 30 is an explanatory view showing an example of a search function provided by the meta data server according to the embodiment.
Figure 31:
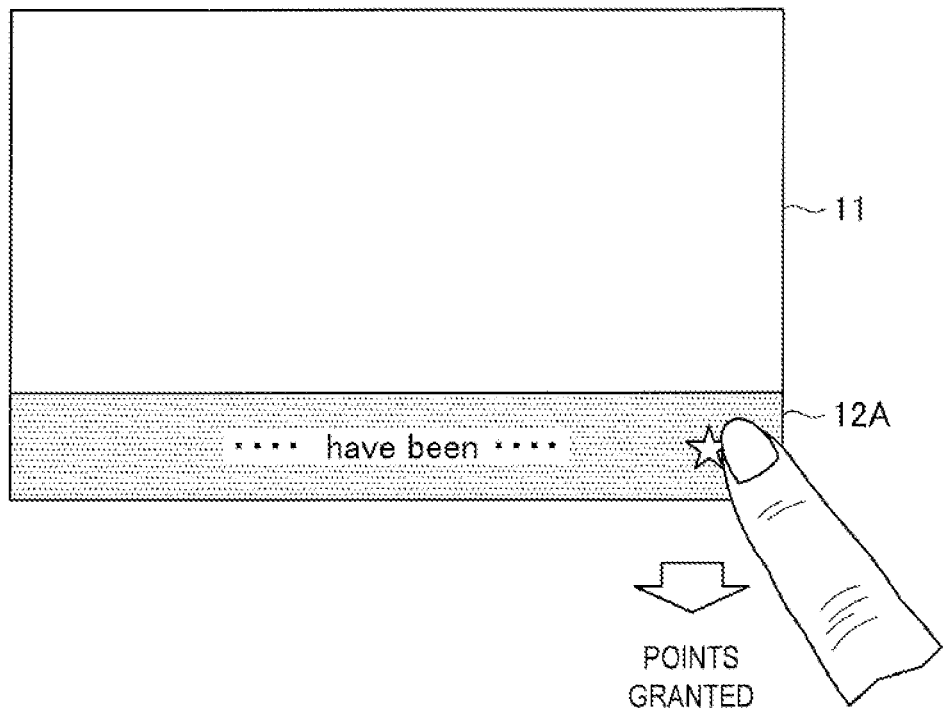
FIG. 31 is an explanatory view showing an example of a quest service provided by the meta data server according to the embodiment.

Next, an example of meta data provided by the meta data server 300 according to the embodiment will be described with reference to FIGS. 24 to 31. FIG. 24 is an explanatory view of correcting a subtitles display time of the meta server according to the embodiment. FIG. 25 is an explanatory view showing an example of additional information provided by the meta server according to the embodiment and added to a person. FIG. 26 is an explanatory view illustrating an example of meta data showing a mouth position of a person provided by the meta data server according to the embodiment. FIG. 27 is an explanatory view showing an example of person recognition information provided by the meta data server according to the embodiment. FIG. 28 is an explanatory view showing an example of subtitles display in accordance with a speaker in the user device according to the embodiment. FIG. 29 is an explanatory view showing an example of word display using meta data provided by the meta data server according to the embodiment. FIG. 30 is an explanatory view showing an example of a search function provided by the meta data server according to the embodiment. FIG. 31 is an explanatory view showing an example of a quest service provided by the meta data server according to the embodiment.

As described with reference to FIG. 19, the meta data server 300 can provide information of the text audio synchronization time in which the time when subtitles text is actually vocalized is shown in more detail. Referring to FIG. 19 again, the audio analysis unit 310 of the meta data server 300 can analyze audio data extracted from video data. The subtitles analysis unit 305 can extract text data contained in subtitles data. Then, the meta data generation unit can generate text data with the vocalization time by the audio lyric synchronization technology using audio data and text data.

As shown in FIG. 24, the subtitles display time held on the content side is frequently set longer than the time of actual vocalization. Also, when noise such as BGM (BackGround Music) is contained in audio data, the text audio synchronization time generated by speech recognition may recognize the pronouncing time longer than actual one because the noise is wrongly recognized as a voice. Thus, the meta data generation unit 320 can correct the text audio synchronization time by using such information. The probability that the subtitles display time or the text audio synchronization time is set shorter than the actual pronouncing time is low. That is, the start time of a pronouncing time may be corrected to the later of the subtitles display time and the text audio synchronization time. The end time of a pronouncing time may be corrected to the earlier of the subtitles display time and the text audio synchronization time. By adopting such a configuration, the accuracy of subtitles display time can be increased.

As shown in FIG. 25, the meta data generation unit 320 can generate meta data so that information about a person specified on the screen is displayed. For example, the content ID, subtitles ID, coordinate information on the screen, and additional information may be contained in the meta data by being associated therewith. The additional information may be, for example, CM (CoMmercial) information of the person or personal data. For example, the meta data generation unit 320 can attach additional information such as advertisements or comments to scenes in which a specific person appears. The meta data generation unit 320 can recognize a scene in which a specific person appears based on image analysis results by the image analysis unit 315. The meta data generation unit 320 also acquires the content ID, subtitles ID, and coordinate information corresponding to a scene in which the specific person appears and generates meta data by associating additional information with the acquired information. The coordinate information is desirably stored as normalized values. By adopting such a configuration, coordinates of the specified position can be decided by fitting to the resolution of each client. In addition, by adding meta information in subtitles ID units, information can be added independently of differences of the playback time.

Using analysis results by the image analysis unit 315, the meta data generation unit 320 can recognize the position of the face and the position of the mouth of a person in image data. If, as shown in FIG. 26, the user specifies a specific person on the screen using the information, the face portion thereof is enlarged and displayed. Then, the mouth portion of the specified person may further be enlarged. By enlarging and displaying the mouth portion, the user can check the shape of the mouth when a specific sentence (or word) is vocalized.

As shown in FIG. 27, the meta data generation unit 320 can improve the accuracy of personal discrimination by using image recognition results and speech recognition results together. Information of a group determined to be the same person from image recognition results and information of a group determined to be voices of the same person from speech recognition results can be combined and used. Using, for example, personal discrimination results whose accuracy is improved as described above, representations such as changing the cursor color in accordance with the speaker can be used. Also, as shown in FIG. 28, the display position of subtitles may be changed depending on the speaker. For example, words of speaker A may be displayed in the left end portion of the subtitles display area 12 and words of speaker B may be displayed in the right end portion of the subtitles display area 12.

The meta data generation unit 320 may generate information about the display position such that words are displayed close to the speaker. For example, as shown in the upper figure of FIG. 29, the position where words "They can't be possibly be true." of person C1 are displayed can be analyzed based on the orientation of the face of person C1 or the like. In this case, the face image recognition technology and SLAM (Simultaneously Localization and Mapping) can be used.

The information providing unit 330 of the meta data server 300 can provide the search function across content. When, for example, as shown in FIG. 30, the search keyword "have been" is input, the information providing unit 330 can extract content containing the search keyword by searching subtitles text. By providing such a function, for example, a quest function as shown in FIG. 31 can be provided. For example, when the meta data server 300 issues a quest of "Search for five speeches containing "have been"", if the user performs an operation to check a speech containing the keywords (here, for example, an operation to tap a star mark) when the speech containing the keywords is displayed in the active subtitles display area 12A, points in accordance with the degree of achievement of the quest may be granted to the user. By providing such a service, the desire to learn of the user can be promoted.

<7. Hardware Configuration Example of Server>

Figure 32:
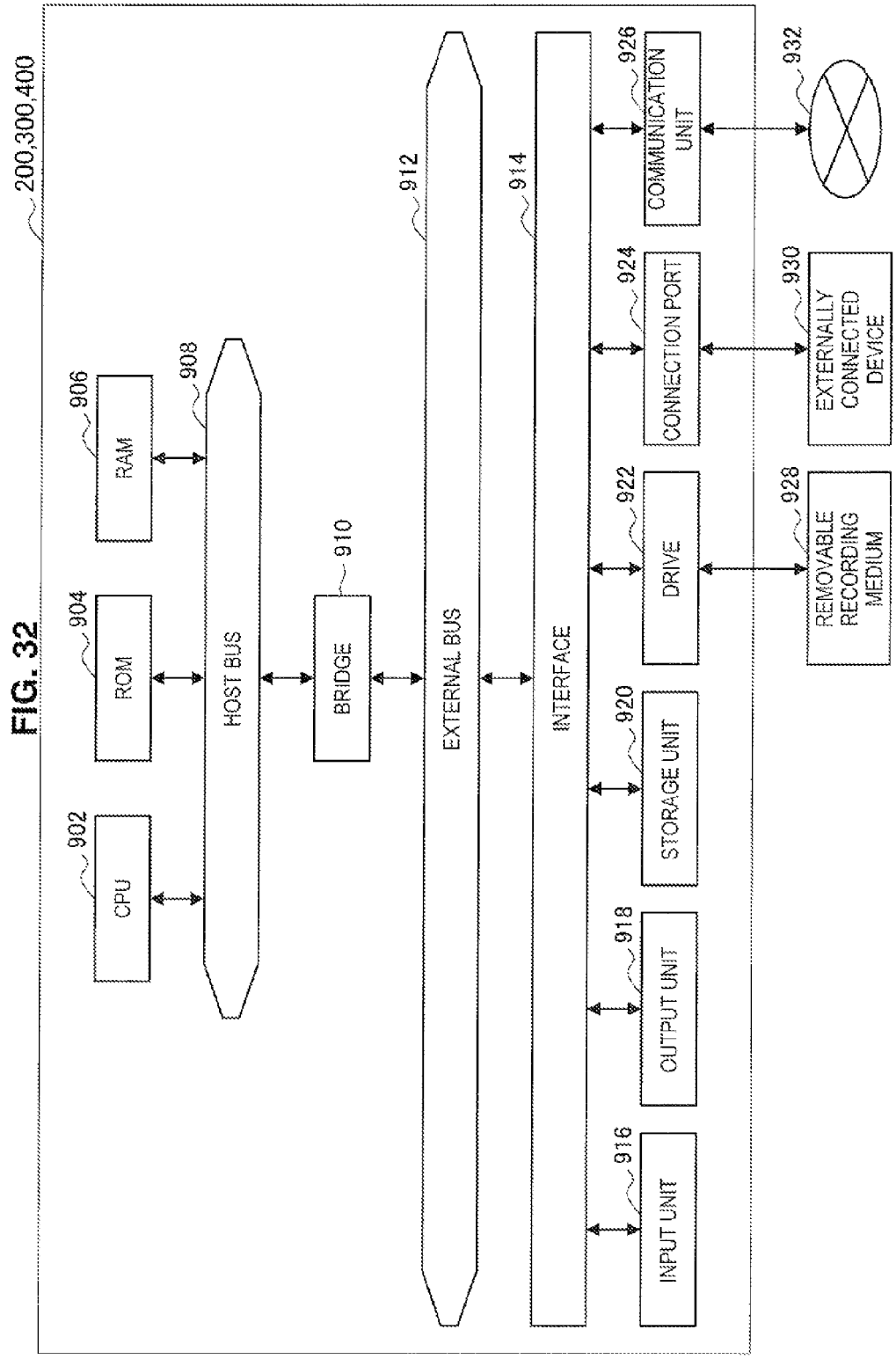
FIG. 32 is a block diagram showing an example of a hardware configuration of a content server, the meta data server, and a recording server according to the embodiment.

An example of the hardware configuration of the content server 200, the meta data server 300, and the recording server 400 will be described with reference to FIG. 32. FIG. 32 is a block diagram showing an example of the hardware configuration of a content server, a meta data server, and a recording server according to the embodiment.

The function of each element of the content server 200, the meta data server 300, and the recording server 400 described above can be realized by, for example, using the hardware configuration shown in FIG. 32. That is, the function of each of the elements can be realized by using a computer program and controlling hardware shown in FIG. 32. The form of the hardware is arbitrary and includes, for example, a mobile information terminal such as a server device, a personal computer, a mobile phone, PHS, and PDA, a game machine, and various information home appliances. The PHS is an abbreviation of Personal Handyphone System. Also, the PDA is an abbreviation of Personal Digital Assistant.

As shown in FIG. 32, the hardware mainly includes a CPU 902, a ROM 904, a RAM 906, a host bus 908, and a bridge 910. Further, the hardware includes an external bus 912, an interface 914, an input unit 916, an output unit 918, a storage unit 920, a drive 922, a connection port 924, and a communication unit 926. The CPU is an abbreviation of Central Processing Unit. Also, the ROM is an abbreviation of Read Only Memory. Then, the RAM is an abbreviation of Random Access Memory.

The CPU 902 functions as a calculation device or a control device and controls an overall operation of each unit or a portion thereof based on various programs recorded in the ROM 904, the RAM 906, the storage unit 920, or a removable recording medium 928. The ROM 904 is a unit for storing programs read by the CPU 902 or data used for operation. In the RAM 906, for example, programs read by the CPU 902 and various parameters that vary appropriately when the programs are executed are stored temporarily or permanently.

These elements are mutually connected via, for example, the host bus 908 capable of high-speed data transmission. On the other hand, the host bus 908 is connected to the external bus 912 whose data transmission speed is relatively low via, for example, the bridge 910. As the input unit 916, for example, a mouse, a keyboard, a touch panel, a button, a switch, a lever or the like is used. Further, as the input unit 916, a remote controller (hereinafter, called a remocon) capable of transmitting a control signal using infrared rays or other radio waves.

The output unit 918 is a device capable of notifying the user of acquired information visually or aurally like, for example, a display device such as CRT, LCD, PDP, and ELD, an audio output device such as a speaker and a headphone, a printer, a mobile phone, a facsimile or the like. The CRT is an abbreviation of Cathode Ray Tube. Also, the LCD is an abbreviation of Liquid Crystal Display. Then, the PDP is an abbreviation of Plasma Display Panel. Further, the ELD is an abbreviation of Electro-Luminescence Display.

The storage unit 920 is a device to store various kinds of data. As the storage unit 920, for example, a magnetic storage device such as a hard disk drive (HDD), a semiconductor storage device, an optical storage device, or a magneto-optical device is used. The HDD is an abbreviation of Hard Disk Drive.

The drive 922 is a device that reads information recorded in the removable recording medium 928, for example, a magnetic disk, an optical disk, a magneto-optical disk, a semiconductor memory or the like or writes information into the removable recording medium 928. The removable recording medium 928 is, for example, a DVD medium, a Blu-ray medium, an HD DVD medium, various semiconductor recording media or the like. The removable recording medium 928 may naturally be, for example, an IC card equipped with a non-contact IC chip, an electronic device or the like. The IC is an abbreviation of Integrated Circuit.

The connection port 924 is a port to connect an externally connected device 930, for example, a USB port, an IEEE1394 port, SCSI, an RS-232C port, an optical audio terminal or the like. The externally connected device 930 is, for example, a printer, a mobile music player, a digital camera, a digital video camera, an IC recorder or the like. The USB is an abbreviation of Universal Serial Bus. Also, the SCSI is an abbreviation of Small Computer System Interface.

The communication unit 926 is a communication device to connect to a network 932 and is, for example, a cable or wireless LAN, communication card for Bluetooth (registered trademark) or WUSB, router for optical communication, ADSL, modem for various kinds of communication or the like. The network 932 connected to the communication unit 926 is configured as a network connected via a cable or wirelessly and is, for example, the Internet, home LAN, infrared-ray communication, visible light communication, broadcasting, satellite communication or the like. The LAN is an abbreviation of Local Area Network. Also, the WUSB is an abbreviation of Wireless USB. Then, the ADSL is an abbreviation of Asymmetric Digital Subscriber Line.

<8. Operation Example>

Figure 33:
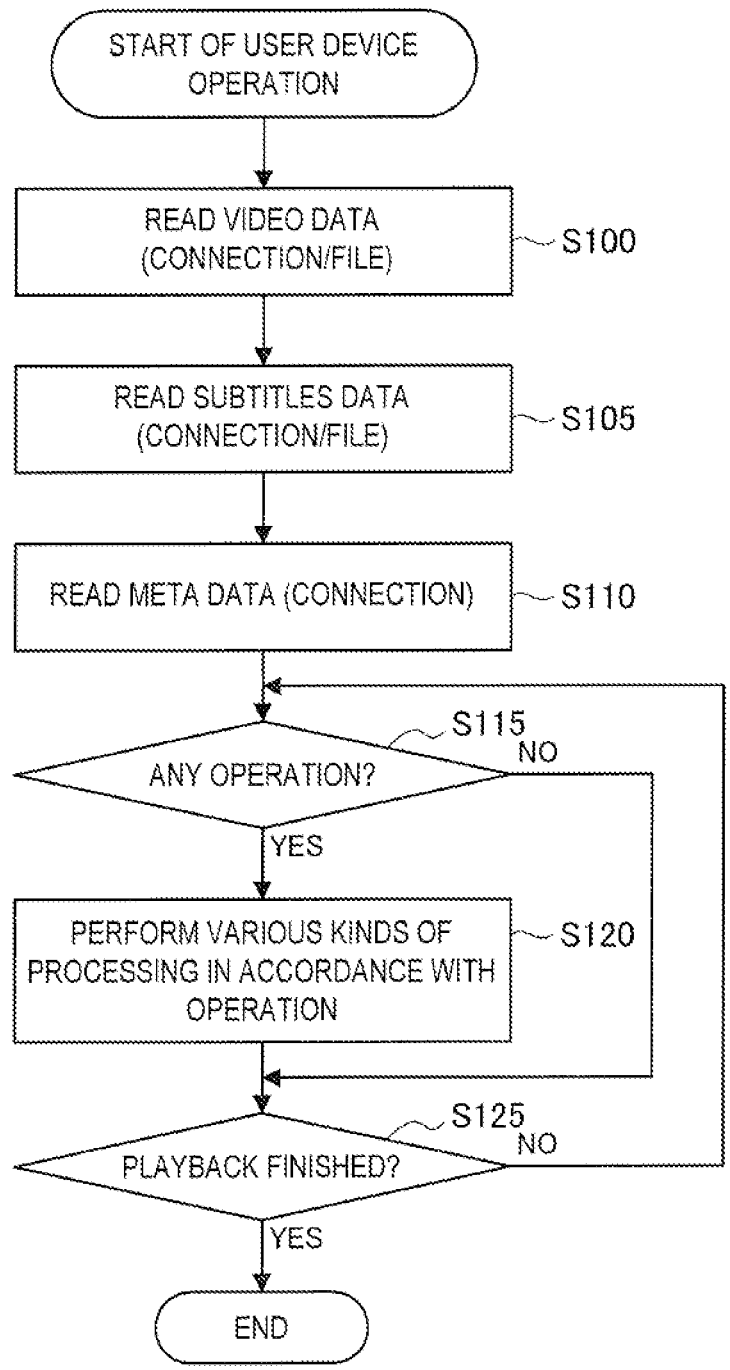
FIG. 33 is a flow chart showing an operation example of the user device according to the embodiment.
Figure 34:
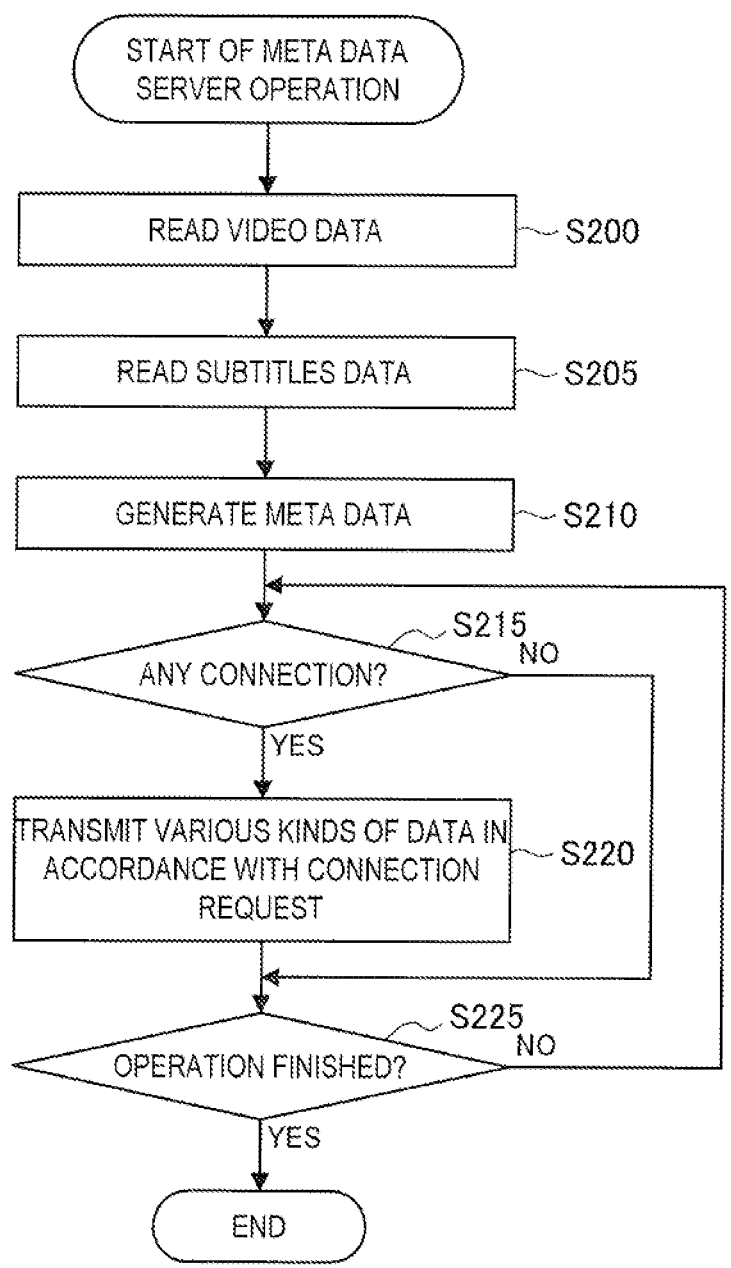
FIG. 34 is a flow chart showing an operation example of the meta data server according to the embodiment.

Next, operation examples of the user device 100 and the meta data server 300 according to the embodiment will be described with reference to FIGS. 33 and 34 respectively. FIG. 33 is a flow chart showing an operation example of the user device according to the embodiment. FIG. 34 is a flow chart showing an operation example of the meta data server according to the embodiment.

Referring to FIG. 33, the user device 100 first reads video data (S100). At this point, the user device 100 reads video data by connecting to the content server 200 or locally stored video data. The user device 100 also reads subtitles data (S105). At this point, the user device 100 reads subtitles data by connecting to the content server 200 or locally stored subtitles data. Then, the user device 100 reads meta data (S110). At this point, the user device 100 reads meta data by connecting to the meta data server 300.

Then, the user device 100 determines whether any operation from the user is detected (S115). Then, if an operation is detected, the user device 100 performs various kinds of processing in accordance with the operation (S120). On the other hand, if no operation is detected, the processing in step S120 is omitted. Then, the user device 100 determines whether playback of content is finished (S125). Then, the processing from step S115 to step S125 is repeated until playback of content is finished.

On the other hand, referring to FIG. 34, the meta data server 300 reads video data (S200). At this point, the meta data server 300 can read video data from the content server 200. Then, the meta data server 300 reads subtitles data (S205). At this point, the meta data server 300 can read subtitles data corresponding to the acquired video data from, for example, the content server 200. Then, the meta data server 300 generates meta data (S210).

Then, the meta data server 300 determines whether any connection from the user device 100 is detected (S215). If a connection from the user device 100 is detected, the meta data server 300 can transmit various kinds of data in response to a connection request (S220). Then, the meta data server 300 determines whether the operation is finished (S225). The processing of step S215 and thereafter is repeated until the operation is determined to be finished in step S225.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, a plurality of functions included in one device in the above embodiment may each be implemented by separate devices. Alternatively, a plurality of functions implemented by a plurality of devices in the above embodiment may each be implemented by separate devices. In addition, one of the above functions may be realized by a plurality of devices. It is needless to say that such configurations are included in the technical scope of the present disclosure.

In this specification, the steps described in the flowcharts include not only the processing that is performed in time series in the described order, but also the processing that is performed in parallel or individually rather than necessarily being performed in time series. Further, even in the steps that are processed in time series, it is needless to mention that the order can be changed as appropriate.

Additionally, the present technology may also be configured as below.

(1)

An information processing device including:

a display control unit that controls display of a display screen containing a content display area and a subtitles display area; and an operation recognition unit that, when a first operation on the subtitles display area is detected, recognizes that an operation to perform second processing is performed, the second processing being different from first processing performed when the first operation on the content display area is detected.

(2)

The information processing device according to (1), wherein the first operation is a drag operation, and wherein the second processing is change processing of a playback speed.

(3)

The information processing device according to any one of (1) or (2), wherein, when the first operation on the subtitles display area is detected, the display control unit starts animation of a background of the subtitles display area.

(4)

The information processing device according to any one of (1) to (3), wherein the second processing is change processing to change a playback speed of content, and wherein, when the first operation on the subtitles display area is detected, the display control unit starts animation in which a background of the subtitles display area moves in a direction showing a playback direction of the content.

(5)

The information processing device according to any one of (1) to (4), wherein a background of the subtitles display area has a pattern attached thereto.

(6)

The information processing device according to any one of (1) to (5), wherein the first processing is seeking processing of content.

(7)

The information processing device according to any one of (1) to (6), wherein the display control unit causes the subtitles display area to display subtitles text after a cursor indicating a current playback position being superimposed thereon.

(6)

An information processing method including:

controlling display of a display screen containing a content display area and a subtitles display area; and when a first operation on the subtitles display area is detected, recognizing that an operation to perform second processing is performed, the second processing being different from first processing performed when the first operation on the content display area is detected.

(7) A program for causing a computer to function as an information processing device including:
a display control unit that controls display of a display screen containing a content display area and a subtitles display area; and
an operation recognition unit that, when a first operation on the subtitles display area is detected, recognizes that an operation to perform second processing is performed, the second processing being different from first processing performed when the first operation on the content display area is detected.

REFERENCE SIGNS LIST 100 user device
150 playback control unit
155 operation unit
160 audio output control unit
165 audio output unit
170 display control unit
175 display unit
180 communication unit
200 content server
300 meta data server
305 subtitles analysis unit
310 audio analysis unit
315 image analysis unit
320 meta data generation unit
325 storage unit
330 information providing unit
400 recording server

The invention claimed is:

1. An information processing device comprising:
a display control unit that is configured to control display of a display screen containing a content display area and a subtitles display area; and
an operation recognition unit that, in an event a first operation on the subtitles display area is detected, is configured to recognize that an operation to perform second processing is performed, the second processing being different from first processing performed in an event the first operation on the content display area is detected,
wherein the display control unit is further configured to start animation in which a background of the subtitles display area moves in a direction showing a playback direction of the content, in an event the first operation on the subtitles display area is detected.

2. The information processing device according to claim 1,
wherein the first operation is a drag operation, and
wherein the second processing is change processing of a playback speed.

3. The information processing device according to claim 1,
wherein, in an event, the first operation on the subtitles display area is detected, the display control unit is configured to start the animation of the background of the subtitles display area, wherein the background moves in a direction showing the playback direction of the content.

4. An information processing device comprising:
a display control unit that is configured to control display of a display screen containing a content display area and a subtitles display area; and
an operation recognition unit that, in an event a first operation on the subtitles display area is detected, is configured to recognize that an operation to perform second processing is performed, the second processing being different from first processing performed in an event the first operation on the content display area is detected,
wherein the second processing is change processing to change a playback speed of content, and
wherein, in an event the first operation on the subtitles display area is detected, the display control unit is further configured to start animation in which a background of the subtitles display area moves in a direction showing a playback direction of the content.

5. The information processing device according to claim 1,
wherein the background of the subtitles display area has a pattern attached thereto.

6. The information processing device according to claim 1,
wherein the first processing is seeking processing of the content.

7. The information processing device according to claim 1,
wherein the display control unit is configured to cause the subtitles display area to display subtitles text after a cursor indicating a current playback position being superimposed thereon.

8. An information processing method comprising:
controlling display of a display screen containing a content display area and a subtitles display area; and
in an event a first operation on the subtitles display area is detected,
recognizing that an operation to perform second processing is performed, the second processing being different from first processing performed in an event the first operation on the content display area is detected, and
starting animation in which a background of the subtitles display area moves in a direction showing a playback direction of the content.

9. A non-transitory computer-readable medium having stored thereon, a set of computer-executable instructions for causing a computer to perform steps comprising:
controlling display of a display screen containing a content display area and a subtitles display area; and
in an event a first operation on the subtitles display area is detected,
recognizing that an operation to perform second processing is performed, the second processing being different from first processing performed in an event the first operation on the content display area is detected, and
starting animation in which a background of the subtitles display area moves in a direction showing a playback direction of the content displayed on the content display area.

* * * * *